United States Patent [19]
Nagashima et al.

[11] Patent Number: 5,733,363
[45] Date of Patent: Mar. 31, 1998

[54] DYE, INK CONTAINING THE SAME, AND INK-JET RECORDING METHOD AND INSTRUMENT USING THE INK

[75] Inventors: Akira Nagashima, Tokyo; Shinichi Tochihara, Hadano; Hiromichi Noguchi, Hachioji, all of Japan

[73] Assignee: Canon Kabushiki Kaisha, Tokyo, Japan

[21] Appl. No.: 392,261

[22] Filed: Feb. 22, 1995

[30] Foreign Application Priority Data

Feb. 28, 1994 [JP] Japan .................. 6-052639

[51] Int. Cl.$^6$ .................. C09D 11/02
[52] U.S. Cl. .................. 106/31.43; 106/31.47; 106/31.48; 106/31.58; 106/31.59
[58] Field of Search .................. 106/22 H, 22 K, 106/22 D, 31.43, 31.47, 31.48, 31.58, 31.59

[56] References Cited

U.S. PATENT DOCUMENTS 4,605,442  8/1986  Kawashita et al. .................. 106/22 K
4,670,547  6/1987  Lehr .................. 534/637
4,997,919  3/1991  Schaulin .................. 534/637

(List continued on next page.)

FOREIGN PATENT DOCUMENTS

A20168961  1/1986  European Pat. Off. .
A10194885  9/1986  European Pat. Off. .
A10348050  12/1989  European Pat. Off. .
A10348344  12/1989  European Pat. Off. .
A10465420  1/1992  European Pat. Off. .
A10468647  1/1992  European Pat. Off. .
A10468649  1/1992  European Pat. Off. .
2386589  11/1978  France .

(List continued on next page.)

OTHER PUBLICATIONS

Chemicals Abstracts, vol. 111, No. 20, p. 116, abstract No. 176183m, "Black disazo dyes", Imani, et al. (Nov. 13, 1989).
Chemical Abstracts, vol. 110, No. 9, p. 92, abstract No. 156104n, "Red disazo dyes for paper, cotton, inks and leather", Hiraki, et al. (May 1,1989).

Primary Examiner—Helene Klemanski
Attorney, Agent, or Firm—Fitzpatrick, Cella, Harper & Scinto

[57] ABSTRACT

Disclosed herein is a dye represented by any one of the following general formulae $$D-R-IM, \quad (I-1)$$

$$\begin{array}{c} D-R-IM, \\ | \\ IM \end{array} \quad (I-2)$$

$$\begin{array}{c} D-R-D, \\ | \\ IM \end{array} \quad (I-3)$$

$$IM-R-D-R-IM, \quad (I-4)$$

$$\begin{array}{c} IM-R-D-R-IM, \\ | \quad\quad | \\ IM \quad\quad IM \end{array} \quad (I-5)$$

$$\begin{array}{c} D \diagdown \quad \diagup IM \\ M \quad \text{and} \\ \diagup \quad \diagdown \\ IM \quad\quad D \end{array} \quad (I-6)$$

$$\begin{array}{c} D \diagdown \quad \diagup R-IM \\ M \\ \diagup \quad \diagdown \\ IM-R \quad\quad D \end{array} \quad (I-7)$$

wherein D is a chromophore, R is a bivalent or trivalent linking group, M is a tetravalent linking group, and IM is a secondary or tertiary amine residue substituted by at least one radical selected from the group consisting of alkyl groups, a carboxyl group, salts of the carboxyl group, a sulfonic group, salts of the sulfonic group, a phosphoric group and salts of the phosphoric group, with the proviso that D, R, M and IM have 1 to 12 acid groups in total.

43 Claims, 3 Drawing Sheets

5,733,363
Page 2

U.S. PATENT DOCUMENTS

| | | | |
|---|---|---|---|
| 5,006,128 | 4/1991 | Pedrazzi | 106/22 H |
| 5,019,165 | 5/1991 | Bruder et al. | 106/22 H |
| 5,084,099 | 1/1992 | Jaeger et al. | 106/22 H |
| 5,098,474 | 3/1992 | Pawlowski et al. | 106/22 H |
| 5,125,969 | 6/1992 | Nishiwaki et al. | 106/22 K |
| 5,135,571 | 8/1992 | Shirota et al. | 106/22 K |
| 5,137,570 | 8/1992 | Nishiwaki et al. | 106/22 K |
| 5,256,194 | 10/1993 | Nishiwaki et al. | 106/22 K |
| 5,328,995 | 7/1994 | Schaulin et al. | 534/797 |
| 5,342,439 | 8/1994 | Lauw | 106/22 H |
| 5,354,369 | 10/1994 | Shimomura et al. | 106/22 H |
| 5,503,666 | 4/1996 | Mennicke et al. | 106/22 H |

FOREIGN PATENT DOCUMENTS

| | | |
|---|---|---|
| 2062163 | 6/1971 | Germany . |
| A13228286 | 2/1983 | Germany . |
| 57-59969 | 4/1982 | Japan . |
| 59-027973 | 2/1984 | Japan . |
| 61-2772 | 1/1986 | Japan . |
| 61-2773 | 1/1986 | Japan . |
| 61-2774 | 1/1986 | Japan . |
| 61-2771 | 2/1986 | Japan . |
| 62-16232 | 8/1987 | Japan . |
| 2-41369 | 2/1990 | Japan . |
| A2254335 | 10/1992 | United Kingdom . |

DYE, INK CONTAINING THE SAME, AND INK-JET RECORDING METHOD AND INSTRUMENT USING THE INK

BACKGROUND OF THE INVENTION

1. Field of the Invention

The present invention relates to a dye and an ink containing such a dye, in particular, a dye and an ink suitable for ink-jet uses, and an ink-jet recording method using such an ink and ink-jet instruments containing the ink therein.

2. Related Background Art

Inks with greatly various manners of being composed have been hitherto reported in respect of inks for writing utensils (fountain pens, marking pens, ball-point pens making use of a water-based ink, etc.) and for ink-jet recording. In particular, in recent years, detailed researches and developments have been made from various aspects such as compositions and physical properties of inks because of a strong demand for improving the water fastness of images printed on plain paper such as paper for copying, paper for reporting, notepaper and letter paper, which are commonly used in offices.

For example, Japanese Patent Application Laid-Open Nos. 59-27973 and 2-41369 have separately proposed a method of improving the water fastness of the resulting printed image by using a reactive dye to which an imine compound has been reacted.

Besides, Japanese Patent Application Laid-Open Nos. 61-2771, 61-2772, 61-2773 and 61-2774 have separately proposed a method of improving the water fastness of a dye by reacting an alkylamino group or alkoxyalkylamino group having 6 to 18 carbon atoms with a specific dye structure.

However, these methods can improve the water fastness of the resulting printed image, but involve a problem that the resulting inks become poor in solubility and hence undergo, for example, crusting or clogging at an orifice. Therefore, it is necessary to add a great amount of a solvent, for example, a polyhydric alcohol (glycol or the like), or use a solvent high in dissolving ability. Then, print quality, for example, sharpness of characters or the like, is deteriorated.

Japanese Patent Application Laid-Open No. 62-16232 also has proposed a method of improving the water fastness of the resulting printed image by using a reactive dye to which a polyhydric alcohol, formamide, hydroxypyrrolidone or the like has been reacted. However, this method also uses a great amount of a solvent, and so the quality of the resulting printed image is deteriorated.

Further, Japanese Patent Application Laid-Open No. 2-41369 has proposed a method of improving the water fastness of the resulting printed image by using a dye to which a polyamine has been reacted. In this method, however, the stability of the dye in its aqueous solution is poor, and the resulting ink tends to cause crusting and clogging. If the stability of the dye in its aqueous solution is intended to improve, the water fastness of the resulting printed image becomes liable to be deteriorated.

On the other hand, Japanese Patent Application Laid-Open No. 57-59969 has proposed a method of improving the water fastness of an acid dye by reacting an aminocarboxylic acid with the acid group of the acid dye. However, this method involves a problem that the quality of the resulting image is adversely affected.

SUMMARY OF THE INVENTION

It is accordingly an object of the present invention to provide a dye having sufficient water fastness without adversely affecting the quality of the resulting printed image when conducting printing on plain paper such as acid paper or neutralized paper, commonly used in offices and the like, an ink good in both solution stability of such a dye and resistance to clogging, and an ink-jet recording method and instruments using such an ink.

The above object can be achieved by the present invention described below.

According to the present invention, there is thus provided a dye represented by any one of the following general formulae

 (I-1)

 (I-2)

 (I-3)

 (I-4)

 (I-5)

 (I-6)

 (I-7)

wherein D is a chromophore, R is a bivalent or trivalent linking group, M is a tetravalent linking group, and IM is a secondary or tertiary amine residue substituted by at least one radical selected from the group consisting of alkyl groups, a carboxyl group, salts of the carboxyl group, a sulfonic group, salts of the sulfonic group, a phosphoric group and salts of the phosphoric group, with the proviso that D, R, M and IM have 1 to 12 acid groups in total. Preferably, D, R, M and IM have 3 to 8 acid groups in total.

According to the present invention, there is also provided an ink comprising, in a liquid medium, a dye represented by any one of the following general formulae

 (I-1)

 (I-2)

 (I-3)

 (I-4)

 (I-5)

 (I-6)

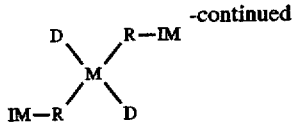

wherein D is a chromophore, R is a bivalent or trivalent linking group, M is a tetravalent linking group, and IM is a secondary or tertiary amine residue substituted by at least one radical selected from the group consisting of alkyl groups, a carboxyl group, salts of the carboxyl group, a sulfonic group, salts of the sulfonic group, a phosphoric group and salts of the phosphoric group, with the proviso that D, R, M and IM have 1 to 12 acid groups in total.

According to the present invention, there is further provided an ink-jet recording method comprising applying an ink to a recording medium by an ink-jet system to conduct recording, wherein the ink described above is used as said ink.

According to the present invention, there is still further provided a recording unit comprising an ink container portion and a head from which the ink is ejected in the form of ink droplets, wherein the ink described above is used as said ink.

According to the present invention, there is yet still further provided an ink cartridge comprising an ink container portion, wherein the ink described above is used as said ink.

According to the present invention, there is yet still further provided an ink-jet recording apparatus comprising the recording unit described above.

According to the present invention, there is yet still further provided an ink-jet recording apparatus comprising the ink cartridge described above.

DESCRIPTION OF THE PREFERRED EMBODIMENTS

Figure 1:
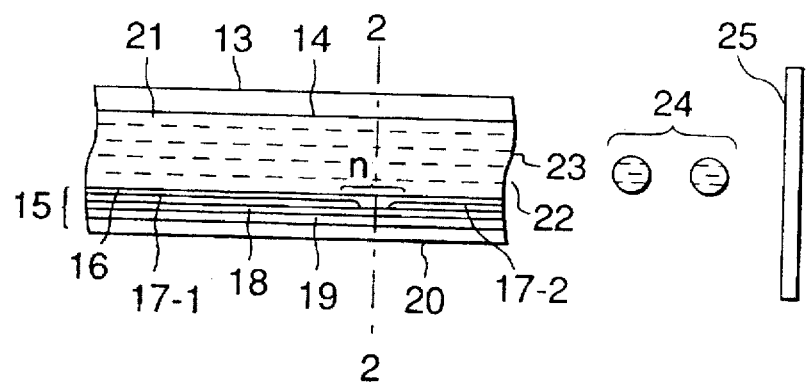
FIG. 1 is a longitudinal cross-sectional view of a head of an ink-jet recording apparatus.

The present inventor has carried out an extensive investigation as to various dyes with a view toward improving the water fastness of printed images using water-soluble dyes. As a result, it has been found that a specific dye composed of a chromophore reacted with a secondary or tertiary amine substituted by at least one radical selected from the group consisting of alkyl groups, a carboxyl group, salts of the carboxyl group, a sulfonic group and salts of the sulfonic group is good in solubility in water and turns hardly water-soluble when put on a recording material, and that an ink comprising this dye as a coloring material can prevent the occurrence of feathering without impairing the quality of an image formed even on, for example, plain paper which causes feathering with common inks, can achieve an improvement in the water fastness of the resulting printed image, and is good in solution stability, resistance to clogging and resistance to aggregation. In addition, it has been found that even when such an ink is used in ink-jet recording, the reliability of an ink-jet recording system is not impaired. The present invention has been led to completion on the basis of these findings.

The present invention will hereinafter be described in more detail by the preferred embodiments.

As the chromophores in the dyes according to the present invention, there may be used residues of azo dyes, anthraquinone dyes, phthalocyanine dyes, triphenodioxazine dyes and the like. These dye residues preferably have 1 to 5 acid groups in their molecules. A carboxyl group, a phosphoric group and/or a sulfonic group are preferred as these acid groups, with the sulfonic group being particular preferred. If two or more acid groups exist, they may be identical with or different from each other. The dyes having such a chromophore or chromophores preferably have a solubility of at least 1% in water at pH 8 or higher, more preferably at least 2% in water at pH 9 or higher.

Preferable azo dyes as the chromophores are mono- or bis-azo dyes derived from a benzene or naphthalene diazo component and a benzene, naphthalene or monocyclic coupler. Pyridone and pyrazolone are preferable monocyclic heterocyclic couplers. Preferable diazo components and couplers are those typically used in preparation of water-soluble dyes, in particular, direct dyes, acid dyes and cellulose-reactive dyes [in general, having a substituent selected from the group consisting of hydroxy, amino, $C_{1-4}$-alkylamino, di-($C_{1-4}$-alkyl)amino, phenylamino, naphthylamino, acetylamino, nitro, cyano, $C_{1-4}$-alkyl, $C_{1-4}$-alkoxy, trifluoromethyl, halogens, particularly chlorine and bromine, and particularly acid groups giving good water-solubility, for example, a carboxyl group, a phosphoric group and a sulfonic group].

As illustrative examples of these azo dyes, may be mentioned dyes having the following general formula (A) in the form of a free acid

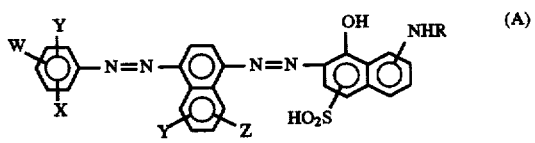

wherein R is a bivalent or trivalent linking group which may have a carboxyl group, W is a carboxyl group, X is hydrogen or a carboxyl group, Y is hydrogen, OH or a sulfonic group, and Z is hydrogen, a carboxyl group or a sulfonic group, with the proviso that the number of carboxyl groups in the molecule is equal to or more than the number of sulfonic groups.

These dyes preferably have 2 to 4 carboxyl groups in their molecules.

In these compounds, at least 2 carboxyl groups, preferably at least 3 carboxyl groups are preferably bonded directly to carbon atoms in an aromatic ring or aromatic rings. When X is hydrogen, W may be situated at any position ortho, meta or para to the azo group. However, W is preferably situated at a para position. When X is a carboxyl group, the two carboxyl groups are preferably situated at 3,4- or 3,5-positions to the azo group.

The number of sulfonic groups is preferably 2 or less. Namely, Y and Z are not sulfonic groups at the same time. Besides, the number of carboxyl groups is preferably more than the number of sulfonic groups.

The anthraquinone dyes as the chromophores preferably have up to five substituents, in particular, up to four substituents selected from the group consisting of hydroxy, $C_{1-4}$-alkoxy, phenoxy, amino, mono- or di-($C_{1-4}$-alkyl) amino, phenylamino (in particular, tolylamino or acetylaminophenylamino), nitro and sulfonate. The sulfonic group may be situated on either the anthraquinone ring or any one of the above-described substituents.

The phthalocyanine dyes as the chromophores are preferably copper phthalocyanines having up to ten terminal substituents selected from the group consisting of halogens, particularly chlorine and bromine, $C_{1-4}$-alkyl- or phenyl-sulfonamide, and particularly 1 to 4 sulfonic groups.

In order to prepare symmetric dyes in the general formulae (I-1) to (1-7), the triphenodioxazine dyes as the chromophores are preferably 9,10-dihalogeno-1,5-disulfotriphenodioxazines having amino groups or hydroxyl groups at 2,6- and/or 3,7-positions for being bonded, preferably through a linking group, to a residue of a secondary or tertiary amine substituted by at least one atomic group selected from the group consisting of alkyl groups, a carboxyl group, salts of the carboxyl group, a sulfonic group and salts of the sulfonic group.

Preferable linking groups are derived from compounds having active hydrogen or halogen which reacts to an amino group or a hydroxyl group. Therefore, the chromophore is derived by removing hydrogen, or a hydroxyl or amino group completely from a dye having preferably one hydroxyl group, more preferably one amino group. The dye, from which the chromophore is derived, preferably has a sufficient number of amino groups and/or hydroxyl groups, in particular, amino groups, and is bonded to a proper number of linking groups through these groups. At this time, the dye can combine with another chromophore and/or a residue of a secondary or tertiary amine substituted by at least one atomic group selected from the group consisting of alkyl groups, a carboxyl group, salts of the carboxyl group, a sulfonic group and salts of the sulfonic group.

Examples of preferable chromophores in the dyes according to the present invention are as follows:

1-hydroxy-2-[1-(4-sulfophenylazo)-6-sulfonaphth-4-ylazo]-3-sulfonaphth-7-ylamino;

1-hydroxy-2-[1-(4-sulfophenylazo)-6-sulfonaphth-4-ylazo]-3,6-disulfonaphth-7-ylamino;

1-hydroxy-2-[1-(4-sulfophenylazo)-naphth-4-ylazo]-3-sulfonaphth-7-ylamino;

3-[4-(1-hydroxy-3-sulfo-7-aminonaphth-2-ylazo)-6-sulfonaphth-1-ylazo]-4-sulfophenylamino;

1-hydroxy-2-(2-sulfophenylazo)-3,6-disulfonaphth-8-ylamino;

3-[1-amino-2-(4-nitrophenylazo)-3,6-disulfo-8-hydroxynaphth-7-ylazo]-4-sulfophenylamino;

1-hydroxy-2-[1-(4-carboxyphenylazo)-6-sulfonaphth-4-ylazo]-3-sulfonaphth-7-ylamino-;

1-hydroxy-2-[1-(2-sulfo-5-aminophenylazo)-6-sulfonaphth-4-ylazo]-3-sulfonaphth-7-ylamino;

1-hydroxy-2-[4-(2,5-disulfophenylazo)-2-methoxy-5-methylphenylazo]-3,6-disulfonaphth-8-ylamino;

1-hydroxy-2-(2-sulfophenylazo)-3-sulfonaphth-6-ylamino;

1-hydroxy-2-(1,5-disulfonaphth-2-ylazo)-3,6-disulfonaphth-8-ylamino;

3-[1-amino-2-(4-[4-(amino-2-hydroxyphenylazo) phenylamino]-3-sulfophenylazo)-3,6-disulfo-8-hydroxynaphth-7-ylazo]-4-sulfophenylamino;

3-[1-amino-2-(4-[4-(2-amino-4-hydroxyphenylazo) phenylamino]-3-sulfophenylazo)-3,6-disulfo-8-hydroxynaphth-7-ylazo]-4-sulfophenylamino;

9,10-dichloro-1,5-disulfotriphenodioxazin-2,6-yl-bis (aminoethyl)amino;

copper aminoethylaminosulfonylphthalocyanine trisulfonic acid;

copper aminosulfonylphthalocyanine disulfonic acid; and 5-(1-amino-2-sulfoanthraquinon-4-ylamino)-2-sulfophenylamino.

As the bivalent or trivalent linking groups in the dyes according to the present invention, there may be used, for example, reactive radicals each having reactive groups given in Table 1 which will be shown subsequently. The linking groups are however not limited to these groups, and various substituent groups and groups of the addition type may hence be used.

Further, the chromophores and reactive radicals in the dyes according to the present invention may be anionic dyes or reactive dyes as a whole. Specific examples of the reactive dyes are mentioned below. The reactive dyes are however not limited to these dyes. Besides, a plurality of the dyes may be used.

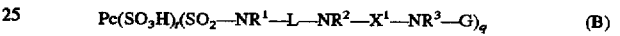

$$Pc(SO_3H)_t(SO_2-NR^1-L-NR^2-X^1-NR^3-G)_q \qquad (B)$$

wherein Pc denotes a metal-containing phthalocyanine ring, $R^1$, $R^2$ and $R^3$ denote independently hydrogen, an alkyl group, a substituted alkyl group, an alkenyl group, a substituted alkenyl group, an aralkyl group or a substituted aralkyl group, L denotes a divalent organic linking group, $X^1$ denotes a carbonyl group, or a group of the formula

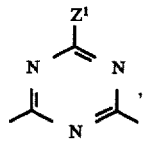

(2)

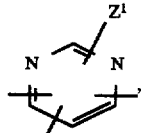

(3)

or

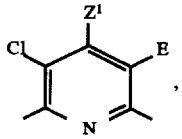

(4)

in which $Z^1$ denotes Cl, $SR^4$ or $OR^4$, $Y^1$ denotes hydrogen, Cl, $Z^1$, $SR^5$ or $OR^5$, E denotes Cl or CN, and $R^4$ and $R^5$ are independently hydrogen, an alkyl group, a substituted alkyl group, an aryl group, a substituted aryl group, an aralkyl group or a substituted aralkyl group, G denotes a colorless organic residue substituted by one or two carboxyl groups, and t+q is an integer of 3 or 4.

An exemplary compound of the general formula (B) includes a compound of the formula

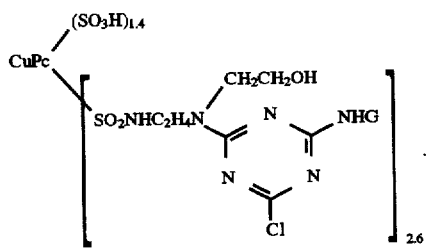

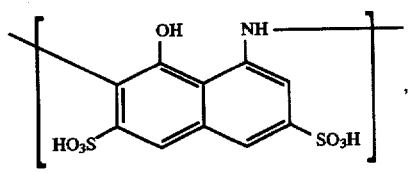

Ar¹N=NJX¹(NR⁶LNR⁷X¹)ₙJN=NAr²    (C)

wherein J denotes a radical of the formula

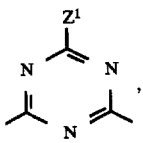

,

Ar¹ and Ar² denote independently an aryl group or a substituted aryl group, and at least one of Ar¹ and Ar² has at least one substituent group selected from a sulfonic group and a carboxyl group, R⁶ and R⁷ denote independently hydrogen, an alkyl group, a substituted alkyl group, an alkenyl group or a substituted alkenyl group, L denotes a divalent organic linking group, n is 0 or 1, and X¹ denotes a carbonyl group, or a group of the formula

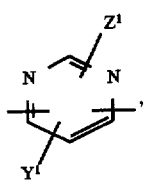   (2)

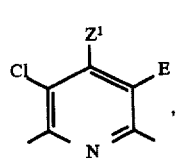   (3)

or

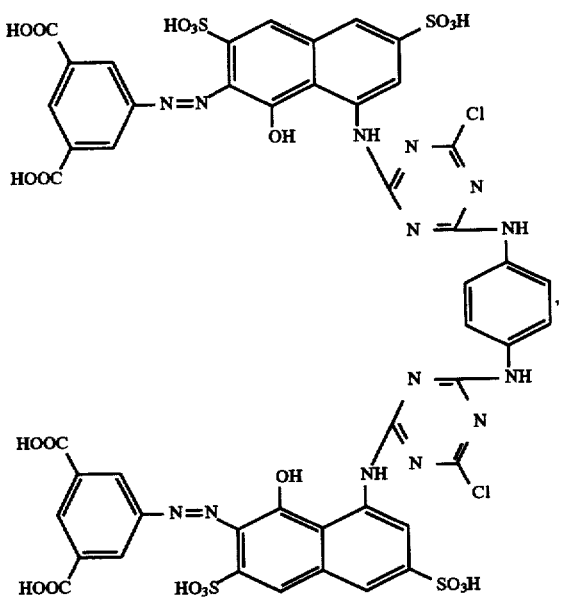   (4)

in which $Z^1$, $Y^1$ and E are as defined above.

Specific examples of the dyes represented by the general formula (C) may include the following compounds of the formulae

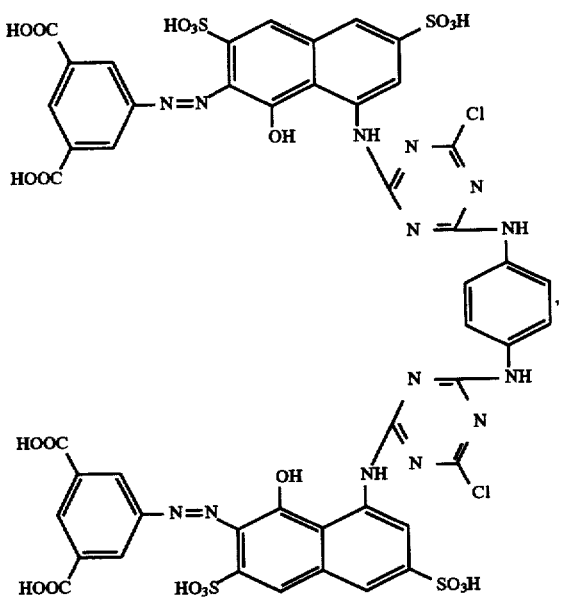

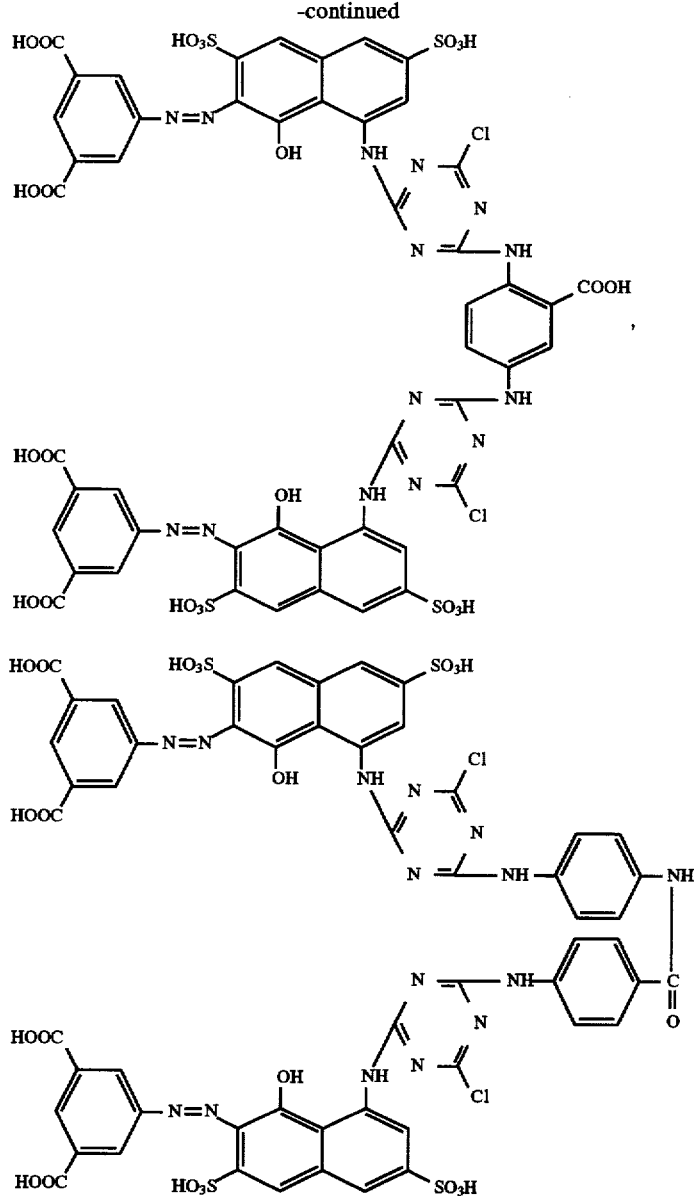
and

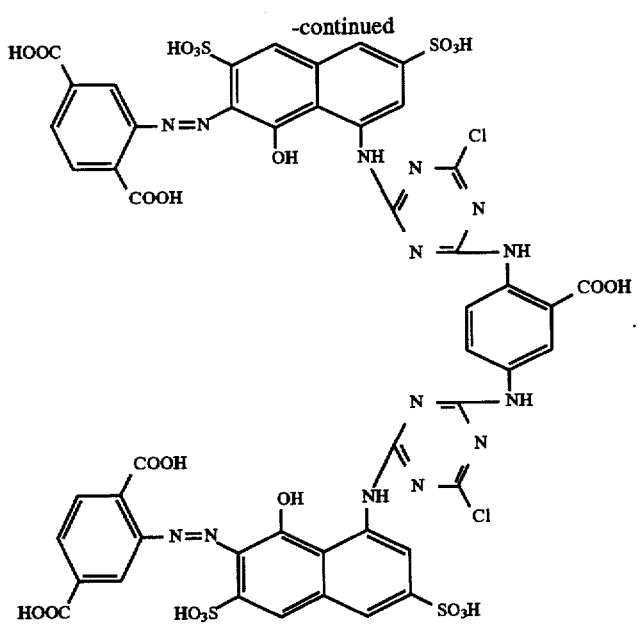

Dyes having the general formula (D) in the form of a free acid.

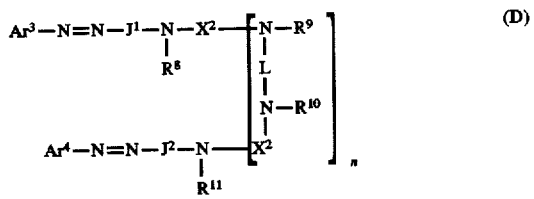

wherein $Ar^3$ and $Ar^4$ are independently an aryl group or a substituted aryl group, at least one of which has at least one substituent group selected from the group consisting of a sulfonic group and a carboxyl group, $J^1$ and $J^2$ are independently represented by the general formula

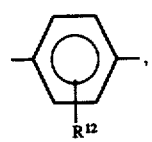

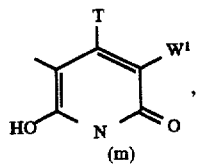

or

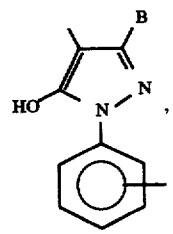

in which $R^{12}$ is selected from the group consisting of hydrogen, alkyl groups, substituted alkyl groups, alkoxy groups, halogens, CN, a ureido group and $NHCOR^{13}$ ($R^{13}$ being hydrogen, an alkyl group, a substituted alkyl group, an aryl group, a substituted aryl group, an aralkyl group or a substituted aralkyl group) T is an alkyl group, $W^1$ is selected from the group consisting of hydrogen, CN, $-CONR^{14}R^{15}$, a pyridinium group and a carboxyl group, m is an alkylene chain having 2 to 8 carbon atoms, B is selected from the group consisting of H, alkyl groups and a carboxyl group, $R^8$, $R^9$, $R^{10}$, $R^{11}$, $R^{14}$ and $R^{15}$ are independently selected from the group consisting of hydrogen, alkyl groups and substituted alkyl groups, L is a divalent organic linking group, n is 0 or 1, and $X^2$ is a carbonyl group or a group represented by the formula

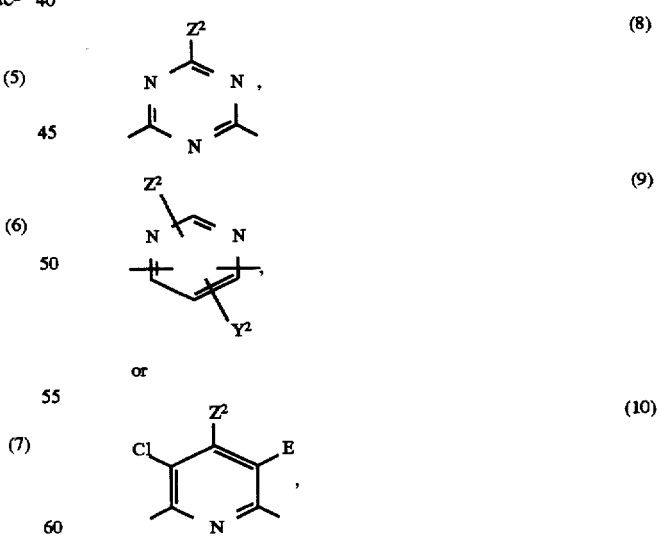

in which $Z^2$ is selected from the group consisting of $OR^{16}$, $SR^{16}$ and Cl, $Y^2$ is selected from the group consisting of hydrogen, Cl, CN and $Z^2$, E is selected from the group consisting of Cl and CN, and $R^{16}$ is H, an alkenyl group, a substituted alkenyl group, an alkyl group, a substituted alkyl group, an aryl group, a substituted aryl group, an aralkyl group or a substituted aralkyl group, with the proviso that the compound of the formula (D) has (i) at least two groups selected from a carboxyl group and a thiocarboxyl group where no sulfonic group is contained therein, or (ii) has the same number of groups selected from a carboxyl group and a thiocarboxyl group as the number of sulfonic groups where the compound of the formula (D) has one or more sulfonic groups.

Specific examples of the dyes represented by the formula (D) are shown below.

Dye 1:

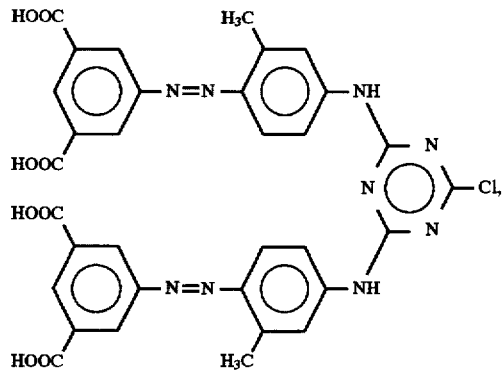

Dye 2:

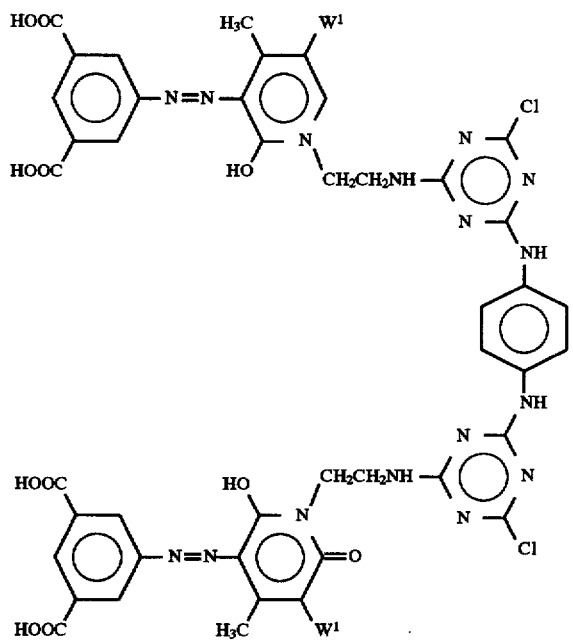

Dye 3:

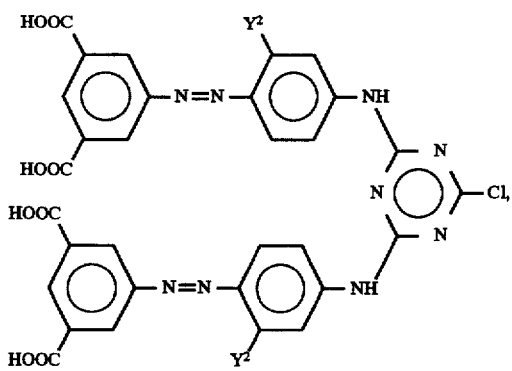

-continued

Dye 4:

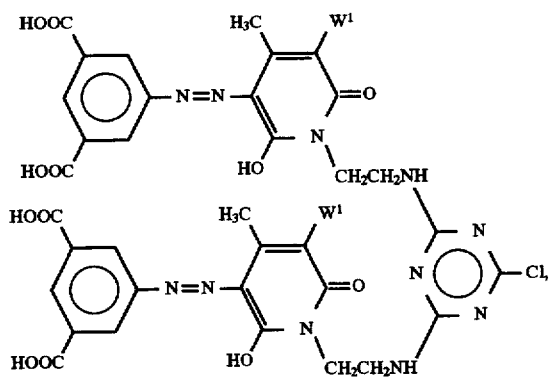

Dye 5:

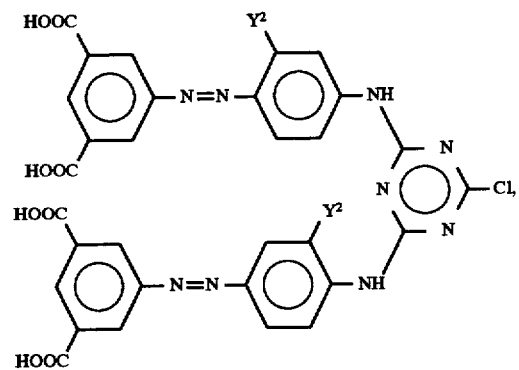

Dye 6:

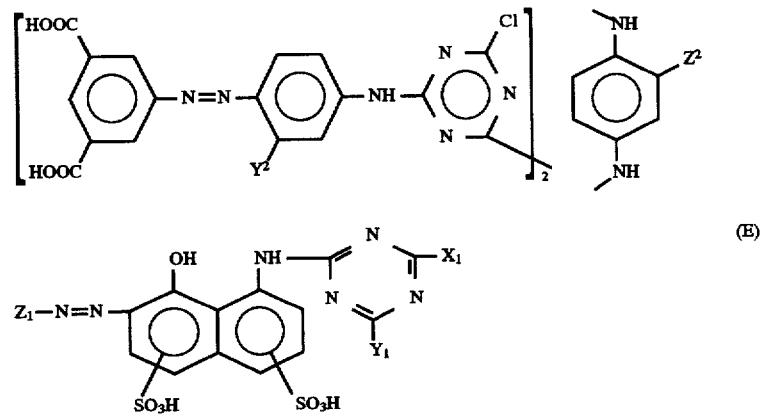

(E)

$$Z_1-N=N-\text{[naphthalene with OH, SO}_3\text{H, SO}_3\text{H, NH-C(=N)-triazine(X}_1\text{,Y}_1\text{)]}$$

wherein $X_1$ and $Y_1$ are independently chlorine, $NR_1NR_2$ or $NR_3R_4$, in which $R_1$ and $R_2$ denote independently hydrogen, an alkyl group, a substituted alkyl group, an aryl group, a substituted aryl group, an aralkyl group, a substituted aralkyl group, an alkoxy group or a substituted alkoxy group, $R_3$ is hydrogen, an alkyl group, a substituted alkyl group, an alkenyl group, a substituted alkenyl group, an aralkyl group, a substituted aralkyl group, an alkoxy group or a substituted alkoxy group, and $R_4$ is a colorless organic residue substituted by a thiocarboxyl group or a carboxyl group, at least one of $X_1$ and $Y_1$ is chlorine, and $Z_1$ is a group of the formula

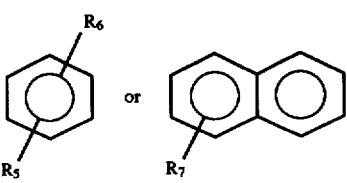

in which $R_5$ and $R_6$ are independently a sulfonic group, a carboxyl group, an alkyl group or a substituted alkyl group, and $R_7$ is a sulfonic group or a carboxyl group.

Examples of yellow dyes useful in the practice of the present invention include C.I. Reactive Yellow 2, 3, 15, 18, 23, 24, 24:1, 25, 27, 37, 42, 57, 76, 81, 84, 85, 87, 88, 91, 92, 93, 95, 102, 111, 116, 135, 136, 137, 138, 142, 143, 145, 151, 160, 161, 162, 163, 164, 165, 166, 167, 168, 175, 178 and 179.

Examples of red dyes useful in the practice of the present invention include C.I. Reactive Red 1, 3, 3:1, 4, 7, 8, 9, 12, 13, 17, 21, 22, 23, 24, 29, 31, 33, 35, 41, 43, 45, 49, 55, 56, 63, 88, 96, 106, 111, 112, 113, 114, 120, 126, 128, 130, 131, 141, 171, 174, 180, 183, 184, 187, 190, 193, 194, 195, 204, 218, 219, 220, 221, 222, 223, 224, 226, 228, 229, 235, 236, 237, 240, 241, 253 and 256.

Examples of cyan dyes useful in the practice of the present invention include C.I. Reactive Blue 15, 21, 25, 41, 63, 72, 77, 190, 207, 227 and 231.

Examples of black dyes useful in the practice of the present invention include C.I. Reactive Black 1, 5, 8, 13, 14, 31, 34 and 39.

Examples of orange dyes useful in the practice of the present invention include C.I. Reactive Orange 5, 7, 12, 13, 14, 15, 16, 33, 35, 56, 72, 72:1, 74, 82, 84, 92, 93, 95, 99 and 164.

Examples of brown dyes useful in the practice of the present invention include C.I. Reactive Brown 1, 2, 7, 8, 9, 11, 17, 18, 21, 31, 32, 33, 46 and 47.

Examples of green dyes useful in the practice of the present invention include C.I. Reactive Green 8, 12, 15 and 19.

Examples of violet dyes useful in the practice of the present invention include C.I. Reactive Violet 1, 2, 4, 5, 6, 22, 36 and 38.

Examples of blue dyes useful in the practice of the present invention include C.I. Reactive Blue 2, 4, 5, 7, 13, 14, 19, 27, 28, 38, 39, 49, 52, 79, 81, 104, 119, 122, 147, 160, 162, 166, 176, 182, 184, 187, 191, 194, 195, 198, 203, 204, 209, 211, 214, 216, 217, 220, 221, 222, 228, 230 and 235.

Such dyes can be prepared by the reaction of their corresponding dyes having at least one amino group or hydroxyl group with a compound having active chlorine, such as cyanuric chloride, polychloropyrimidine or quinoxaline. A dye having a carbonyl group, a sulfonyl group or a methylene linking group can be obtained by the reaction of phosgene, formaldehyde or chlorosulfonic acid with a group of a compound having at least one of a secondary amine and a tertiary amine substituted by at least one atomic group selected from the group consisting of alkyl groups, a carboxyl group, salts of the carboxyl group, a sulfonic group and salts of the sulfonic group.

TABLE 1

| Structural name | Structure of reactive group | Name of dye (maker) |
| --- | --- | --- |
| Dichloro-triazine | [structure] | Procion MX (ICI) |
| Dichloro-quinoxaline | [structure] | Levafix E (Bayer) |

TABLE 1-continued

| Structural name | Structure of reactive group | Name of dye (maker) |
| --- | --- | --- |
| 5-Chloro-4-methyl-2-methyl-sulfonyl-pyrimidine | [structure] | Levafix P (Bayer) |
| Vinyl sulfone | $-SO_2-CH_2-CH_2-OSO_3H$ | Remazol (Höchst) |
| 2,4-Difluoro-5-chloro-pyrimidine | [structure] | Levafix P-A, E-A (Bayer), Drimarene R, K (Sandoz) |
| Monochloro-methoxy-triazine | [structure] | Cibacron pront (Ciba-Geigy) |
| Vinyl sulfone | $-SO_2NH-CH_2-CH_2-OSO_3H$ | Levafix (Bayer) |
| Monochloro-triazine | [structure] | Procion H (ICI) |
| Trichloro-pyrimidine | [structure] | Drimarene X (Sandoz), Cibacron T (Ciba-Geigy) |

IM set forth in each of the general formulae (I-1) to (I-7), which reacts with the reactive radicals used in the present invention, is preferably a compound represented by the following general formula (II) in the state of a sole compound.

$$R_8-Z_2-N(R_{10})-R_9 \quad (II)$$

wherein $R_8$ denotes an alkyl group having 1 to 48 carbon atoms or hydrogen, $R_9$ denotes $-(CH_2)_a-X_2$ or hydrogen, in which a is an integer of 0 to 7, $R_{10}$ denotes $-(CH_2)_b-X_3$, $R_{11}-Y_2-$ or hydrogen, in which b is an integer of 0 to 7, $R_{11}$ denotes an alkyl group having 1 to 48 carbon atoms or hydrogen, $Z_2$ denotes $-(NR_{12}C_lH_{2l})_c(NHC_nH_{2n})_d-$, in which l and n are independently an integer of 2 to 4, and c+d is an integer of 0 to 50, $Y_2$ denotes $(NR_{13}C_mH_{2m})_e(NHC_pH_{2p})_f-$, in which m and p are independently an integer of 2 to 4, and e+f is an integer of 0 to 50, $R_{12}$ denotes $-(CH_2)_g-X_4$, in which g is an integer of 1 to 4, $R_{13}$ denotes $-(CH_2)_h-X_5$, in which h is an integer of 1 to 4, and $X_2$, $X_3$, $X_4$ and $X_5$ are independently selected from the group consisting of a carboxyl group, a sulfonic group and hydrogen, with a proviso that the compound of the general formula (II) has at least one carboxyl group, salt of the carboxyl group, sulfonic group or salt of the sulfonic group.

IM set forth in general formulae (I-1) to (I-7) may have 1 to 32 alkyl groups, preferably 4 to 24 alkyl groups, and more preferably 6 to 18 alkyl groups. In the compound of general formulae (II), c+d and e+f may be independently an integer of 0 to 16, preferably an integer of 0 to 8.

Of the compounds of the general formula (II), compounds having at least one carboxyl group or salt thereof are particularly preferred.

Specific examples of these compounds are mentioned below in the form of salts. However, the compounds of the formula (II) are not limited to these compounds. A plurality of the compounds may also be used.

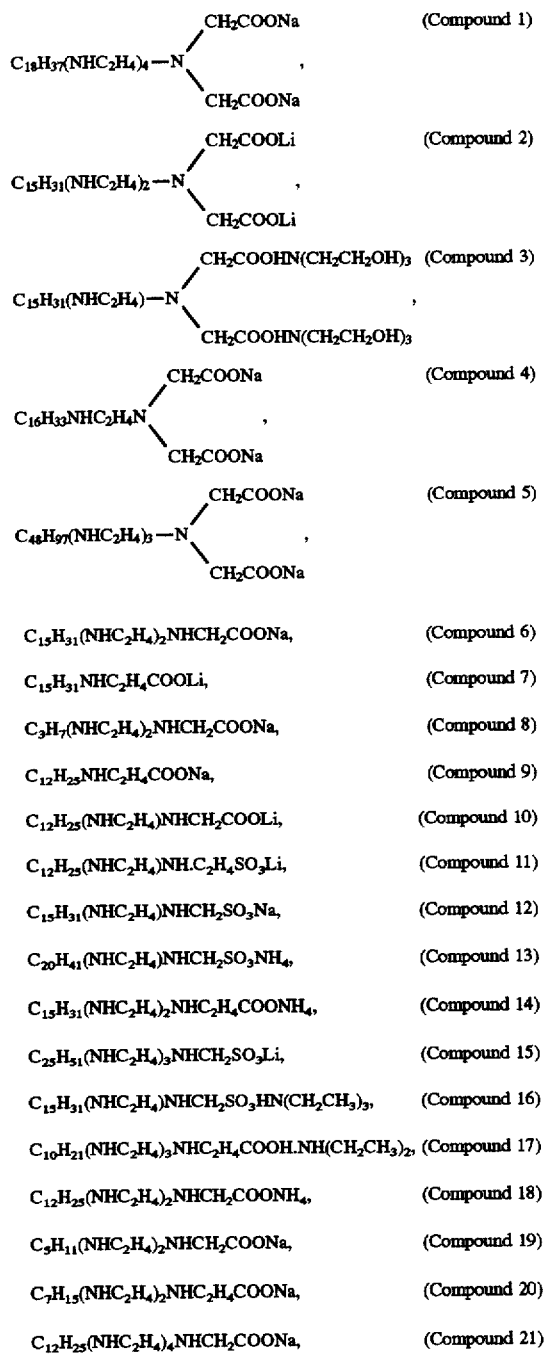

$C_{15}H_{31}(NHC_2H_4)_2NHCH_2COONa$, (Compound 6)

$C_{15}H_{31}NHC_2H_4COOLi$, (Compound 7)

$C_3H_7(NHC_2H_4)_2NHCH_2COONa$, (Compound 8)

$C_{12}H_{25}NHC_2H_4COONa$, (Compound 9)

$C_{12}H_{25}(NHC_2H_4)NHCH_2COOLi$, (Compound 10)

$C_{12}H_{25}(NHC_2H_4)NH.C_2H_4SO_3Li$, (Compound 11)

$C_{15}H_{31}(NHC_2H_4)NHCH_2SO_3Na$, (Compound 12)

$C_{20}H_{41}(NHC_2H_4)NHCH_2SO_3NH_4$, (Compound 13)

$C_{15}H_{31}(NHC_2H_4)_2NHC_2H_4COONH_4$, (Compound 14)

$C_{25}H_{51}(NHC_2H_4)_3NHCH_2SO_3Li$, (Compound 15)

$C_{15}H_{31}(NHC_2H_4)NHCH_2SO_3HN(CH_2CH_3)_3$, (Compound 16)

$C_{10}H_{21}(NHC_2H_4)_3NHC_2H_4COOH.NH(CH_2CH_3)_2$, (Compound 17)

$C_{12}H_{25}(NHC_2H_4)_2NHCH_2COONH_4$, (Compound 18)

$C_5H_{11}(NHC_2H_4)_2NHCH_2COONa$, (Compound 19)

$C_7H_{15}(NHC_2H_4)_2NHC_2H_4COONa$, (Compound 20)

$C_{12}H_{25}(NHC_2H_4)_4NHCH_2COONa$, (Compound 21)

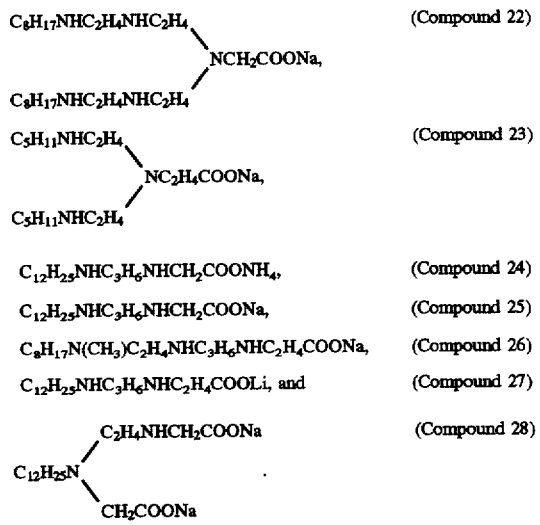

$C_{12}H_{25}NHC_3H_6NHCH_2COONH_4$, (Compound 24)

$C_{12}H_{25}NHC_3H_6NHCH_2COONa$, (Compound 25)

$C_8H_{17}N(CH_3)C_2H_4NHC_3H_6NHC_2H_4COONa$, (Compound 26)

$C_{12}H_{25}NHC_3H_6NHC_2H_4COOLi$, and (Compound 27)

$C_{12}H_{25}N\begin{matrix}C_2H_4NHCH_2COONa \\ \\ CH_2COONa\end{matrix}$ (Compound 28)

The inks according to the present invention are prepared by adding their corresponding dyes represented by the general formulae (I-1) to (I-7) to a liquid medium. Two or more of the dyes represented by the general formulae (I-1) to (I-7) may be mixed for purposes of tone matching and the like. The content of the dye in each of the inks is preferably within a range of from 0.1 to 15.0% by weight, more preferably from 0.5 to 10.0% by weight based on the total weight of the ink though it may vary according to the application and purpose of the ink, the kind of a coloring material used, the composition of the ink, a recording material used, and the like.

For the purpose of improving the water fastness of the inks by the physical change in viscosity, the inks preferably have a pH of 8 or higher. However, they more preferably have a pH of 8.5 or higher, most preferably 9.0 or higher in consideration of reliability as to ejection property, clogging resistance and the like when intended to use in an ink-jet recording method. In the inks according to the present invention, the pH adjustment may also be performed with lithium acetate or lithium hydroxide.

The inks of the present invention may contain, in addition to the above components, various additives such as water-soluble organic solvents, surfactants, rust preventives, antiseptics, mildewproofing agents, anti-oxidants, vaporization accelerators, chelating agents and water-soluble polymers as necessary.

The liquid medium useful in the practice of this invention is preferably a mixed solvent of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; cyclic amide compounds such as 2-pyrrolidone and ε-caprolactam; imide compounds such as succinimide; and the like.

The content of the water-soluble organic solvent in each of the inks is preferably within a range of generally from 1% to 40% by weight, more preferably from 3% to 30% by weight based on the total weight of the ink.

The content of water in the ink is within a range of from 30 to 95% by weight. If the amount of water is less than 30% by weight, the solubility and the like of the dye are deteriorated, and the viscosity of the resulting ink is increased. It is hence not preferable to use water in such a small amount. On the other hand, if the amount of water is greater than 95% by weight, the vaporizing components are too great to satisfy sufficient crusting property.

Taking account of the water fastness and reliability of the resulting ink, which are the objects to be achieved by the present invention, it is preferable to use a volatile amine such as ammonia and an aminoalcohol such as triethanolamine in combination. The content of these amines in the ink is within a range of from 0.01 to 20% by weight, preferably from 0.05 to 10% by weight, more preferably from 0.1 to 5% by weight based on the total weight of the ink. These amines may be contained in the form of counter ions of the dyes of the general formulae (I-1) to (I-7). A ratio of the volatile amine to the aminoalcohol is within a range of from 20:1 to 20:1.2, preferably from 10:1 to 10:1.1.

Besides, taking account of ink-jet suitability such as the prevention of kogation and clogging, each of the inks preferably contains a metal ion such as a sodium, lithium or potassium ion. The content of such a metal ion is within a range of from 0.01 to 20% by weight, preferably from 0.05 to 10% by weight, more preferably from 0.1 to 5% by weight based on the total weight of the ink. These metal ions may be contained in the form of counter ions of the dyes of the general formulae (I-1) to (I-7).

In the inks containing at least one of the dyes represented by the general formulae (I-1) to (I-7) according to the present invention, it is also preferable to use at least one of diamine compounds such as EDTA, tricarboxylic compounds such as citric acid, dicarboxylic compounds such as maleic acid, succinic acid and aspartic acid, phosphoric compounds, and salts of strong acids, such as ammonium sulfate, ammonium chloride, sodium sulfate and the sodium salts of phosphoric compounds. Thus, the ink may comprise an acid salt.

Since the dyes of the general formulae (I-1) to (I-7) pose a problem of kogation due to impurities, which are inorganic ions contained in the inks, it is preferable to contain such a compound so as to ward off such an adverse influence on the inks. Since these anti-kogation agents have a correlation with the surface condition of a heater which transmits thermal energy, however, no addition may be allowed according to circumstances. If the content of the inorganic ions in each of the inks is 1 ppm or lower, preferably 0.5 ppm or lower, such an agent may not be added. The content of these compounds in the ink is within a range of from 0.01 to 10% by weight, preferably from 0.05 to 5% by weight, more preferably from 0.1 to 3% by weight based on the total weight of the ink.

In the inks containing at least one of the dyes represented by the general formulae (I-1) to (I-7) according to the present invention, it is further preferable to use at least one of urea, thiourea and derivatives thereof for the purpose of keeping the solution stability of the dyes of the general formulae (I-1) to (I-7) in the inks good [or of inhibiting the interaction of the dyes themselves or between the dyes of the general formulae (I-1) to (I-7) in the inks]. The content of these compounds in each of the inks is within a range of from 0.1 to 20% by weight, preferably from 1 to 15% by weight, more preferably from 2 to 10% by weight based on the total weight of the ink.

A monohydric alcohol may also be added to each of the inks as a fixing agent for the ink. Nonionic surfactants also function as a fixing agent. These compounds are required to prevent bleeding which may occur at boundaries between different tones when printing is conducted with inks of the different tones. It is preferable to contain these compounds in the inks even from the viewpoint of stably improving the solubility of the dyes of the general formulae (I-1) to (I-7) in the inks. In this case, the nonionic surfactants are preferred in consideration of the amount added to the inks and their effects.

Specific examples of the monohydric alcohol include ethanol, isopropyl alcohol and n-butanol.

Examples of the nonionic surfactants include polyoxyethylene alkyl ethers, polyoxyethylene phenyl ether, polyoxyethylene-polyoxypropylene glycol, polyoxyethylene-polyoxypropylene alkyl ethers and polyethylene oxide adducts of acetylene glycol. However, EO adducts of nonyl phenyl ether, ethylene oxide-propylene oxide copolymers (EO-PO copolymers) and polyoxyethylene oxide adducts of acetylene glycol are preferred. More preferable surfactants are polyoxyethylene oxide adducts of acetylene glycol (EO adducts of acetylene glycol) represented by the formula

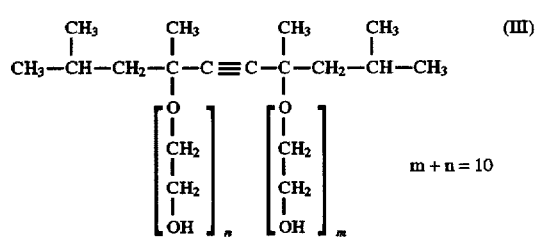

The content of the monohydric alcohol or nonionic surfactant in each of the inks is within a range of from 0.1 to 20% by weight, preferably from 0.5 to 10% by weight based on the total weight of the ink. If the content is lower than 0.1% by weight, the effect of such a compound as a fixing agent is not exhibited. On the other hand, any content higher than 20% by weight results in an ink which can only provide images badly balanced in print quality, for example, between whisker-like feathering, and fixing ability and image density.

The inks according to the present invention are particularly suitable for use in an ink-jet recording system of the type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the inks may however be adjusted in some cases.

The inks according to the present invention are desirably adjusted so as to have, as their own physical properties, a surface tension of 30 to 68 dyne/cm and a viscosity of 15 cP or lower, preferably 10 cP or lower, more preferably 5 cP or lower as measured at 25° C. from the viewpoint of solving the problem of water fastness of the resulting printed images when recorded on plain paper or the like and at the same time, making the matching of the inks with an ink-jet head good.

In order to adjust the physical properties of the inks to the above-described values and solve the problems on plain paper, accordingly, it is preferred that the content of water in the inks of the present invention be adjusted to form not lower than 50% to not higher than 98% by weight, preferably, from not lower than 60% to not higher than 95% by weight.

The inks according to the present invention may suitably be used, in particular, in an ink-jet recording system of the type that recording is conducted by ejecting droplets of an ink by the action of thermal energy. However, the inks may also be used for general-purpose writing utensils.

As preferable methods and apparatus for conducting recording by using the inks according to the present invention, may be mentioned methods and apparatus in which thermal energy corresponding to recording signals is applied to an ink within a recording head, and ink droplets are generated in accordance with the thermal energy.

Figure 2:
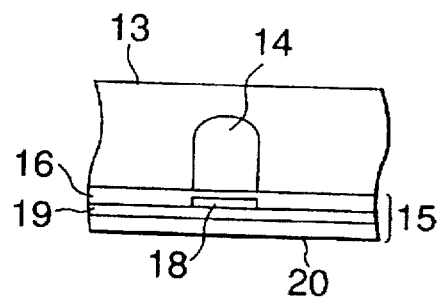
FIG. 2 is a transverse cross-sectional view taken on line 2—2 in FIG. 1.
Figure 3:
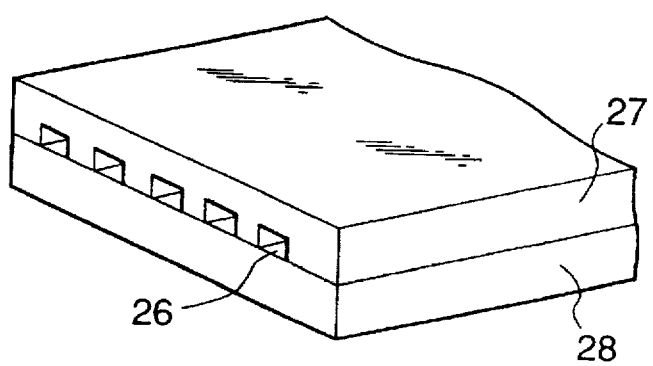
FIG. 3 is a perspective view of the appearance of a multi-head which is an array of such heads as shown in FIG. 1.

Examples of the construction of an head, which is a main component of such an apparatus, are illustrated in FIGS. 1, 2 and 3. A head 13 is formed by bonding a glass, ceramic or plastic plate or the like having a groove 14 through which an ink is passed, to a heating head 15, which is used for thermal recording (the drawings show a head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1. Incidentally, FIG. 1 is a cross-sectional view of the head 13 taken along the flow path of the ink, and FIG. 2 is a cross-sectional view taken along line 2—2 in FIG. 1.

Figure 4:
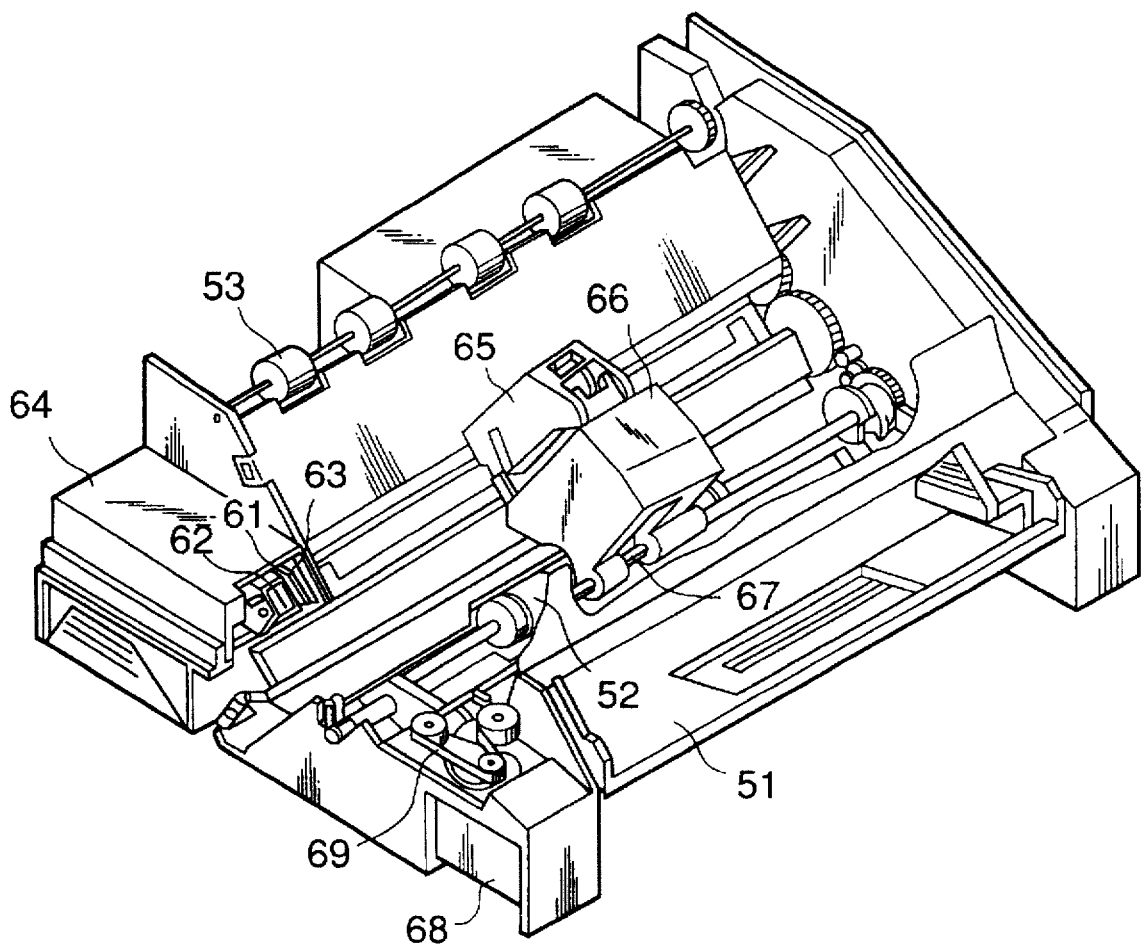
FIG. 4 is a perspective view of an illustrative ink-jet recording apparatus.

FIG. 4 illustrates an example of an ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
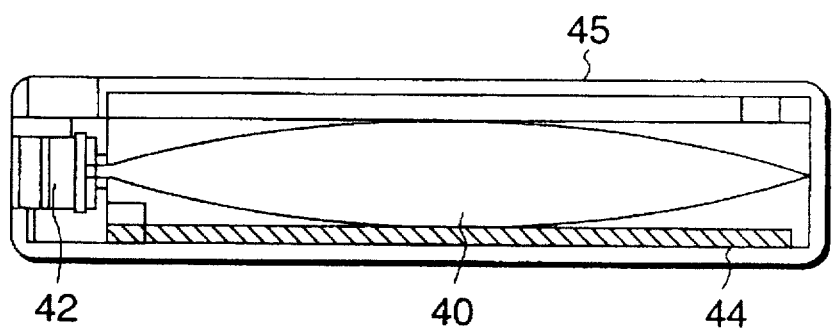
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact. The ink-jet recording apparatus used in this invention may not be limited to the apparatus as described above in which the head and the ink cartridge are separately provided. Therefore, a device in which these members are integrally formed as shown in FIG. 6 can also be preferably used.

Figure 6:
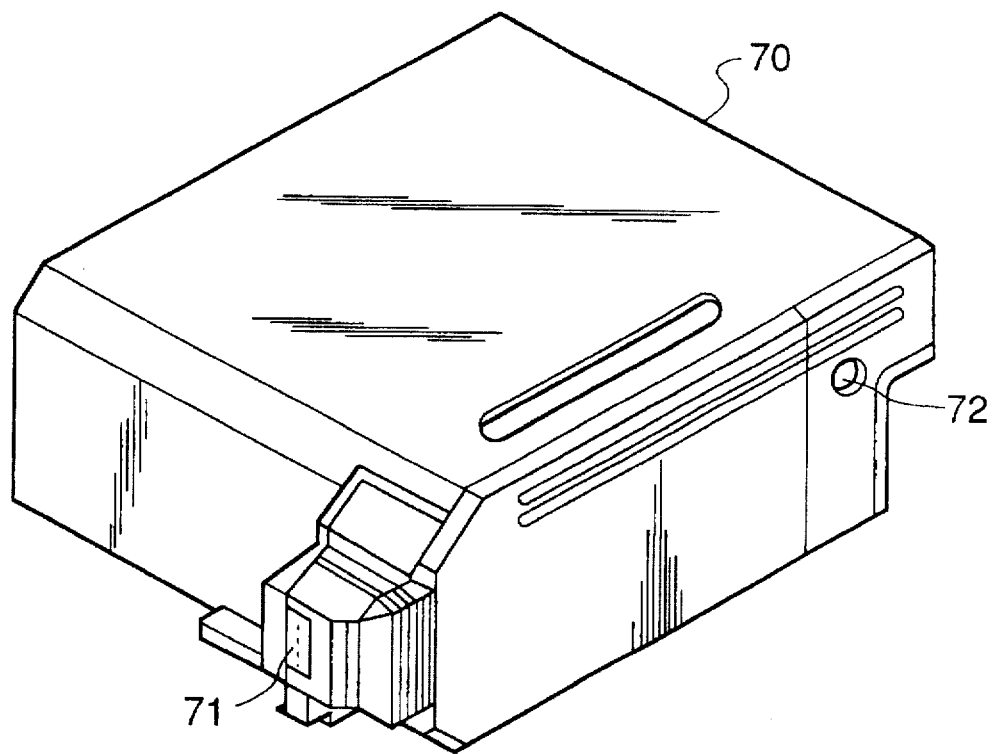
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane, cellulose or polyvinyl acetal is preferably used as a material for the ink-absorbing member. Reference numeral 72 indicates an air passage for communicating the interior of the recording unit 70 with the atmosphere. This recording unit 70 can be used in place of the recording head 65 shown in FIG. 4, and is detachably installed on the carriage 66.

The present invention will hereinafter be described more specifically by the following Synthetic Examples, Examples and Comparative Examples. Incidentally, all designations of "part" or "parts" and "%" as will be used in the following examples mean part or parts by weight and % by weight unless expressly noted.

[SYNTHESIS EXAMPLES]

The dyes of the general formulae (I-1) to (I-7) to be separately contained in the inks according to the present invention were synthesized in the following manner.

(Preparation process)

After an amine represented by the formula

(a)

is diazotized with sodium nitrite in a mineral acid such as hydrochloric acid or sulfuric acid, the resulting diazotized amine is coupled with an amine represented by the formula

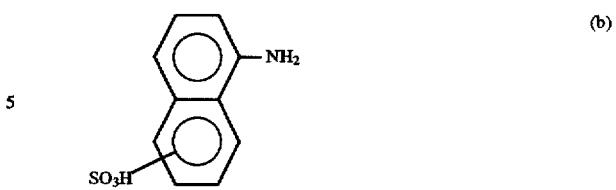
(b)

to obtain a monoazo compound represented by the formula

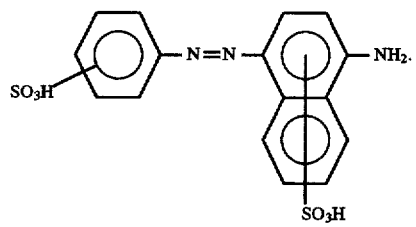
(c)

After the resulting monoazo compound is similarly diazotized with sodium nitrite or the like in a mineral acid such as hydrochloric acid or sulfuric acid, the thus-formed compound is coupled with a naphthol represented by the formula

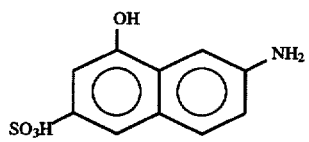
(d)

to obtain a disazo compound represented by the formula

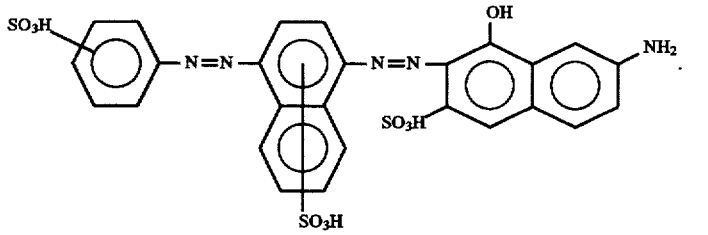
(e)

This disazo compound is reacted with, for example, cyanuric chloride (trichlorotriazine) to obtain a disazo compound represented by the formula

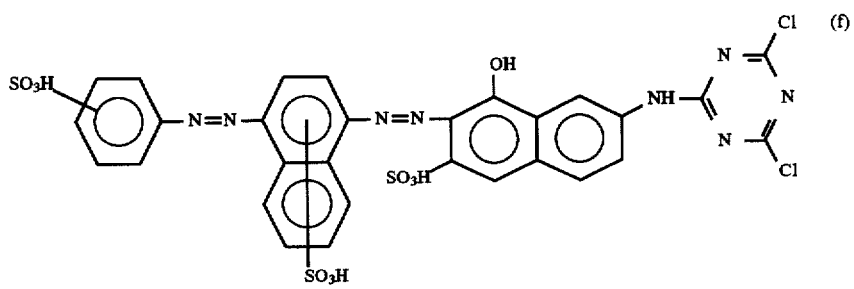

[at this time, the compound of the formula (f) may be another reactive dye].

Thereafter, the thus-formed compound (f) is stirred for 24 hours in a dilute alkali solution at a water temperature of about 80° C. together with a compound having at least one of a secondary amine and a tertiary amine substituted by at least one radical selected from the group consisting of alkyl groups, a carboxyl group, salts of the carboxyl group, a sulfonic group and salts of the sulfonic group, and optionally other compounds which may be substituted, thereby obtaining the intended dye represented by any one of the general formulae (I-1) to (I-7).

Twelve dyes as described below were then synthesized in accordance with the synthetic procedure described above, and were separately used to prepare inks of Examples 1 to 13. In each case, the counter ion was an ammonium ion.

Synthesis Example 1

Chromophore and reactive group

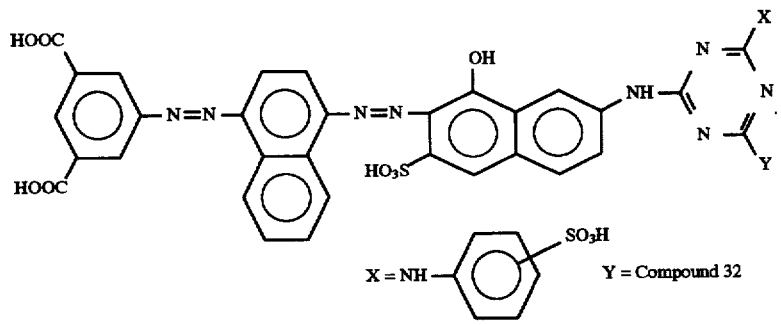

Synthesis Example 2

Chromophore and reactive group

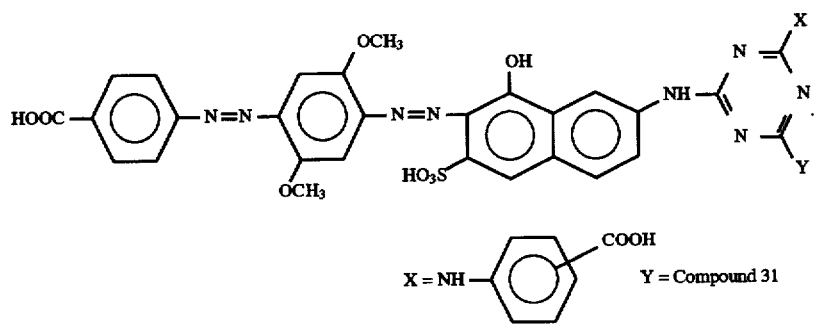

Synthesis Example 3
Chromophore and reactive group
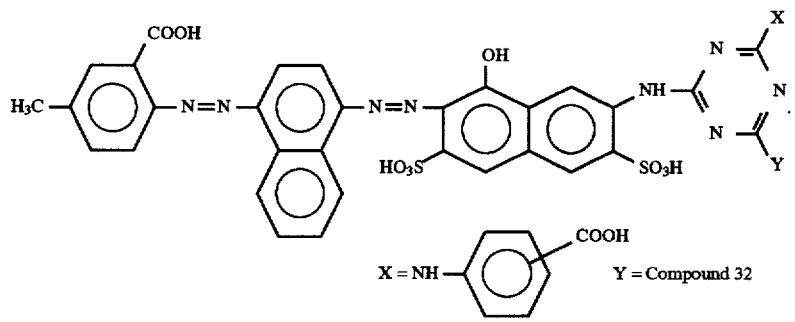
X = NH—⟨phenyl-COOH⟩   Y = Compound 32
Synthesis Example 4
Chromophore and reactive group
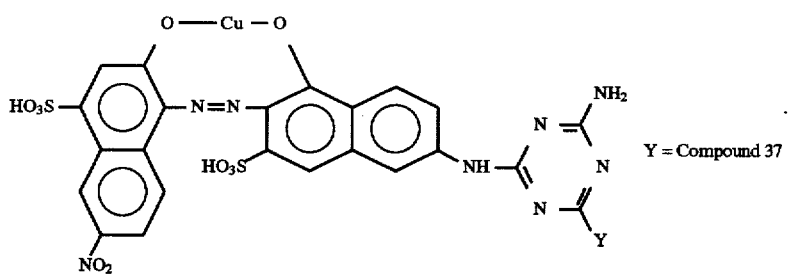
Y = Compound 37
Synthesis Example 5
Chromophore and reactive group
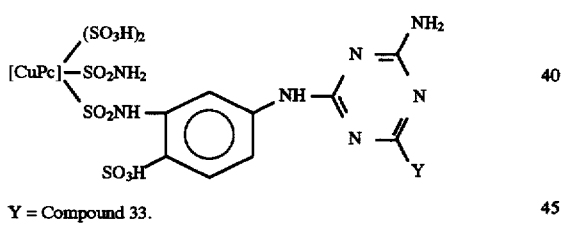
Y = Compound 33.
Synthesis Example 6
Chromophore and reactive group
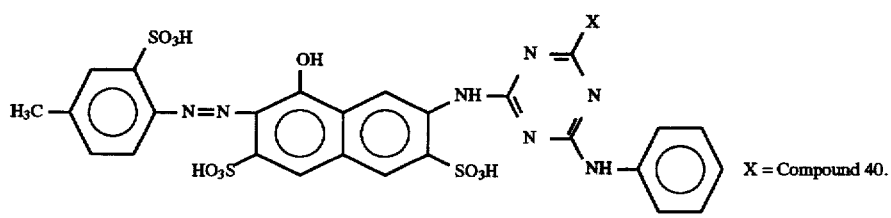
X = Compound 40.

Synthesis Example 7
Chromophore and reactive group
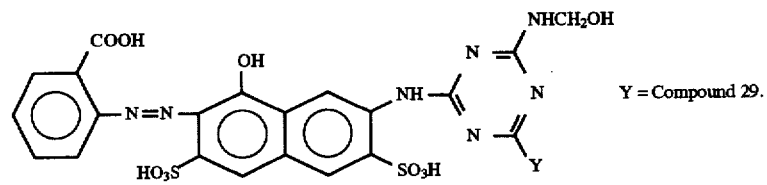
Y = Compound 29.
Synthesis Example 8
Chromophore and reactive group
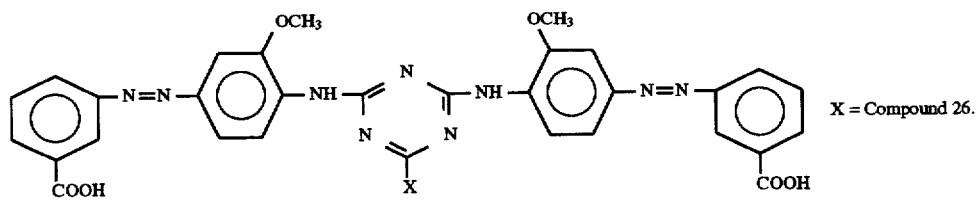
X = Compound 26.
Synthesis Example 9
Chromophore and reactive group
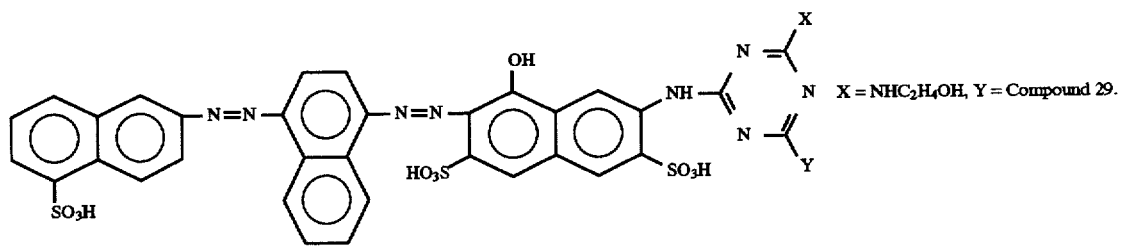
X = $NHC_2H_4OH$, Y = Compound 29.
Synthesis Example 10
Chromophore and reactive group
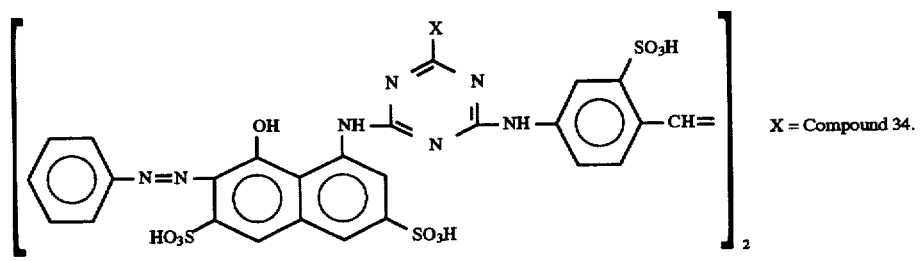
X = Compound 34.

Synthesis Example 11

Chromophore and reactive group

[Anthraquinone structure with NH2, SO3H, and NH-phenyl-COOH substituents, X position labeled]

X = Compound 36.

Synthesis Example 12

Chromophore and reactive group

[Structure with phenyl-O-phenyl(Cl)-N=phenyl-O structure, with SO3H, Y, and X substituents]

X = Compound 34, Y = Compound 34.

X and Y in the above formulae are described below as compounds 29 to 41.

$C_{18}H_{37}NHC_2H_4NC_2H_4NH-$, (Compound 29)
                  |
                  $CH_2COOH$ $C_{12}H_{25}NHC_2H_4NHC_2H_4N-$, (Compound 30)
                    |
                    $CH_2COOH$ $CH_2COOH$ (Compound 31)
        |
$C_{15}H_{31}NC_2H_4NC_2H_4NH-$,
              |
              $CH_2COOH$ $C_{12}H_{21}NC_3H_6NH-$, (Compound 32)
           |
           $CH_2CH_2COOH$ $C_6H_{13}NHC_2H_4NC_2H_4NH-$, (Compound 33)
               |
               $CH_2COOH$ $C_{12}H_{25}NC_2H_4NC_2H_4N-$, (Compound 34)
     |     |    |
   $CH_3$ $CH_3$ $CH_2COOH$ $CH_2COOH$ (Compound 35)
             |
$C_{18}H_{37}NC_2H_4NC_2H_4NC_2H_4NH-$,
        |        |
    $CH_2COOH$ $CH_2COOH$ $C_8H_{17}NC_3H_6NHN-$, (Compound 36)
|
$CH_2CH_2COOH$ $-NHC_2H_4NHC_2H_4NHCH_2COOH$, (Compound 37)

$-NHC_2H_4NC_2H_4NHCH_2COOH$, (Compound 38)
          |
          $CH_2COOH$ $CH_2COOH$ (Compound 39)
              /
$-NHC_2H_4NHC_2H_4NHC_2H_4N$
              \
                $CH_2COOH$ $-NHC_2H_6NHC_3H_6NHCH_2COOH$, (Compound 40)

and $CH_2COOH$ (Compound 41)
          |
$-NHC_2H_4NC_2H_4NC_2H_4NCH_2COOH$.
             |        |
          $CH_2COOH$ $CH_2COOH$

[Preparation of ink]

EXAMPLE 1

| | |
|---|---|
| Dye of Synthesis Example 1 | 2.2 parts |
| Glycerol | 5 parts |
| Thiodiglycol | 5 parts |
| Compound of the formula (III) | 1 part |
| Urea | 5 parts |
| NaOH | 0.1 part |
| Purified water | 81.7 parts. |

EXAMPLE 2

| | |
|---|---|
| Dye of Synthesis Example 2 | 2.5 parts |
| Propylene glycol | 7 parts |
| Glycerol | 3 parts |
| Urea | 5 parts |
| Purified water | 82.5 parts. |

EXAMPLE 3

| | |
|---|---|
| Dye of Synthesis Example 3 | 2.7 parts |
| Thiodiglycol | 7 parts |
| Glycerol | 4 parts |
| Urea | 4 parts |
| Isopropyl alcohol | 4 parts |
| Ammonium sulfate | 0.3 part |
| Purified water | 78 parts. |

EXAMPLE 4

| | |
|---|---|
| Dye of Synthesis Example 4 | 3 parts |
| Propylene glycol | 10 parts |
| Triethanolamine citrate | 1 part |
| Pyrrolidone | 5 parts |
| Purified water | 81 parts. |

EXAMPLE 5

| | |
|---|---|
| Dye of Synthesis Example 5 | 3 parts |
| Glycerol | 5 parts |
| Thiodiglycol | 5 parts |
| Compound of the formula (III) | 1 part |
| Urea | 5 parts |
| LiOH | 0.1 part |
| Purified water | 80.9 parts |

EXAMPLE 6

| Dye of Synthesis Example 6 | 3 parts |
|---|---|
| Thiodiglycol | 10 parts |
| Succinimide | 2 parts |
| Urea | 5 parts |
| Triethanolamine | 0.5 part |
| Purified water | 79.5 parts. |

EXAMPLE 7

| Dye of Synthesis Example 7 | 3 parts |
|---|---|
| Thiodiglycol | 10 parts |
| Compound of the formula (III) | 1 part |
| Urea | 5 parts |
| Purified water | 81 parts. |

EXAMPLE 8

| Dye of Synthesis Example 8 | 3 parts |
|---|---|
| Dipropylene glycol | 5 parts |
| Thiodiglycol | 5 parts |
| Compound of the formula (III) | 1 part |
| Urea | 5 parts |
| Lithium acetate | 0.5 part |
| Purified water | 80.5 parts. |

EXAMPLE 9

| Dye of Synthesis Example 9 | 2.5 parts |
|---|---|
| Propylene glycol | 5 parts |
| Glycerol | 5 parts |
| Propyleneurea | 5 parts |
| Compound of the formula (III) | 1.2 part |
| NaOH | 0.2 part |
| Purified water | 81.1 parts. |

EXAMPLE 10

| Dye of Synthesis Example 10 | 2.5 parts |
|---|---|
| Diethylene glycol | 7 parts |
| Thiodiglycol | 5 parts |
| Lithium acetate | 0.2 part |
| 1,1-Diethylurea | 2 parts |
| Purified water | 83.3 parts. |

EXAMPLE 11

The ink prepared in Example 1 was adjusted to pH 8.5 with hydrochloric acid.

EXAMPLE 12

| Dye of Synthesis Example 11 | 2 parts |
|---|---|
| Propylene glycol | 5 parts |
| Thiodiglycol | 7 parts |
| Compound of the formula (III) | 1.5 part |
| Purified water | 83.5 parts. |

EXAMPLE 13

| Dye of Synthesis Example 13 | 2 parts |
|---|---|
| 2-Pyrrolidone | 5 parts |
| Glycerol | 5 parts |
| Urea | 5 parts |
| Purified water | 83 parts. |

Comparative Examples 1 to 10

Inks of Comparative Examples were prepared in the same manner as in Examples 1 to 10 except that the dyes used in Examples 1 to 10 were changed to the ammonium salts of the following Dye Nos. 1 to 10, respectively.

Dye No. 1:

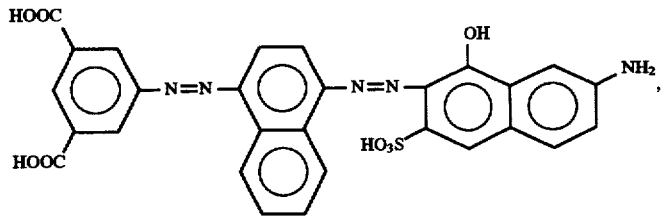

Dye No. 2:

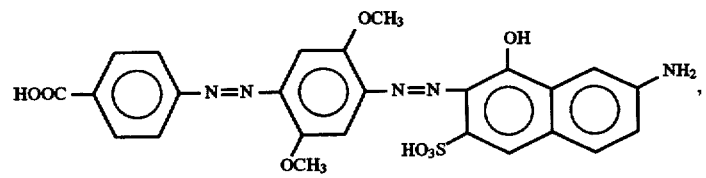

-continued
Dye No. 3:
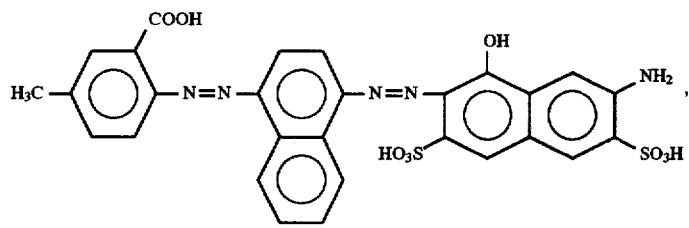
Dye No. 4:
C.I. Reactive Black 1.
Dye No. 5:
C.I. Reactive Blue 7.
Dye No. 6:
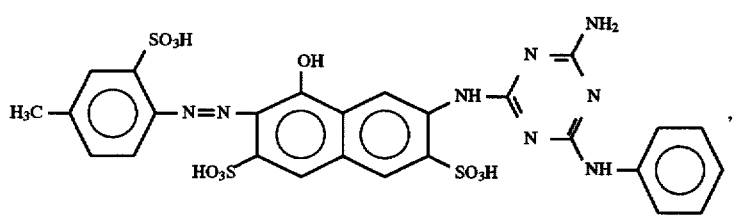
Dye No. 7:
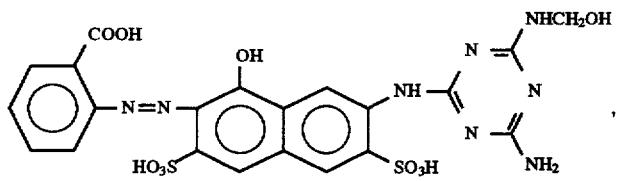
Dye No. 8:
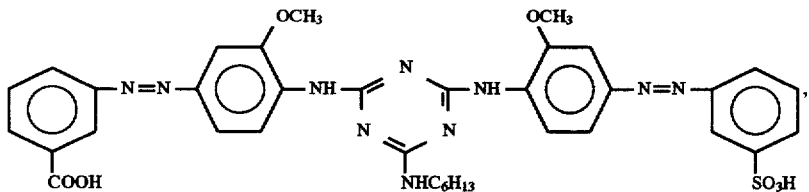
Dye No. 9:
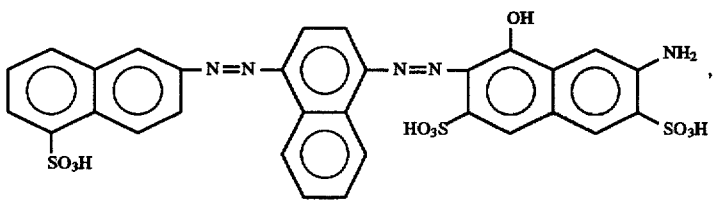
and Dye No. 10:

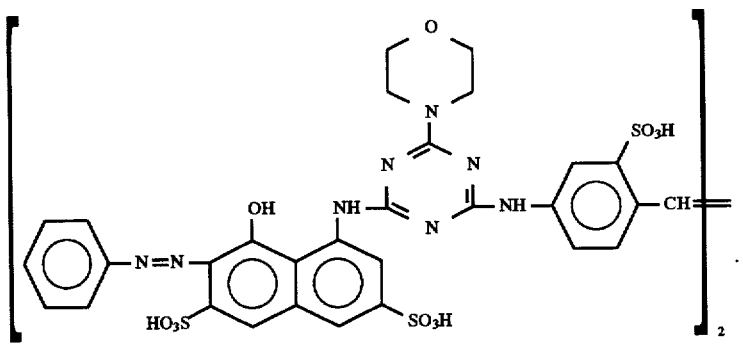

Using the inks obtained in Examples 1 to 13 and Comparative Examples 1 to 10, printing tests were conducted using, as an ink-jet recording apparatus, an On-Demand type ink-jet printer using a heating element as an ejection-energy source to evaluate the inks in (1) water fastness, (2) frequency responsiveness, (3) print quality, (4) resistance to kogation and (5) resistance to boundary bleeding between areas applied with inks of different tones in color image in accordance with the following respective standards. Incidentally, the above-described ink-jet recording apparatus was operated under the following printing conditions:

Drive voltage: 26 V,

Resistance of a heating resistor: 15 Ω, and

Frequency: 4 kHz.

The results are shown in Tables 2 and 3.

[Methods and Standards for Evaluation]

(1) Water fastness (A)

After an ink to be tested was charged into the printer to print English characters and numerals and a solid print on commercially-available acid paper, the printing was stopped and the image density of the resulting print sample was immediately measured by a "Macbeth RD915" (trade name; manufactured by Macbeth Company). After the print sample was then immersed for 3 minutes in a container filled with water, piched up, allowed to stand and dried, its image density was again measured, whereby the percent retention of the image density was calculated. The ink was then evaluated in water fastness and ranked in accordance with the following standard:

A: Percent retention of the image density was not lower than 80%;

B: Percent retention of the image density was not lower than 65% but lower than 80%;

C: Percent retention of the image density was lower than 65.

Water fastness (B)

After an ink to be tested was charged into the printer to print English characters and numerals and a solid print on commercially-available neutralized paper, the printing was stopped and the image density of the resulting print sample was immediately measured by a "Macbeth RD915" (trade name; manufactured by Macbeth Company). After the print sample was then immersed for 3 minutes in a container filled with water, picked up, allowed to stand and dried, its image density was again measured, whereby the percent retention of the image density was calculated. The ink was evaluated in water fastness and ranked in accordance with the following standard:

A: Percent retention of the image density was not lower than 80%;

B: Percent retention of the image density was not lower than 65% but lower than 80%;

C: Percent retention of the image density was lower than 65.

(2) Frequency responsiveness

Each of the resulting print samples was observed by naked eyes with respect to its printing conditions, namely, conditions of blurred characters and blank areas, and defective ink-droplet impact such as splash and slippage to evaluate the ink in frequency responsiveness and ranked in accordance with the following standard:

A: The follow-up condition of the ink to the frequency was substantially good, and none of blurred characters, blank areas and defective ink-droplet impact were observed upon printing of characters, but blur was slightly recognized upon solid printing;

B: None of blurred characters and blank areas were observed, but defective ink-droplet impact was partly recognized upon printing of characters, and upon solid printing, blur and blank areas were observed at portions of about one-third of the whole solid printed area;

C: Blur and blank areas were observed to a great extent upon solid printing, and blurred characters and defective ink-droplet impact were also recognized to a large extent upon printing of characters.

(3) Print quality (A)

English characters and numerals were printed with an ink to be tested on commercially-available acid paper by the printer, and the resulting print sample was left over for at least 1 hour. The print sample was then observed by a microscope and naked eyes to evaluate the ink in print quality by the degrees of sharpness of the letters and whisker-like feathering occurred on the letters and ranked in accordance with the following standard:

AA: The letters were sharp, and no whisker-like feathering occurred;

A: The letters were dull, but no whisker-like feathering occurred;

B: The letters were dull, or whisker-like feathering occurred to a relatively great extent;

C: The letters were dull, and whisker-like feathering also occurred to a great extent.

Print quality (B)

English characters and numerals were printed with an ink to be tested on commercially-available neutralized paper by the printer, and the resulting print sample was left over for at least 1 hour. The print sample was then observed by a microscope and naked eyes to evaluate the ink in print quality by the degrees of sharpness of the letters and whisker-like feathering occurred on the letters and ranked in accordance with the following standard:

- AA: The letters were sharp, and no whisker-like feathering occurred;
- A: The letters were sharp, but whisker-like feathering slightly occurred;
- B: The letters were dull, or whisker-like feathering occurred to a great extent;
- C: The letters were dull, and whisker-like feathering also occurred to a great extent.

(4) Resistance to kogation

After sixty thousand English characters were printed with an ink to be tested by an ink-jet color printer, BJ10 (trade name, manufactured by Canon Inc.) under the above-described conditions, the surface of a heater in the printer was observed, whereby the ink was evaluated in resistance to kogation and ranked in accordance with the following standard:

- A: The surface of the heater remained substantially unchanged;
- B: Some deposit was recognized on the surface of the heater;
- C: Deposit was recognized on the whole surface of the heater.

(5) Resistance to boundary bleeding between areas applied with inks of different tones in color image The inks in Examples 1, 5, 7 and 8 were combined to use as inks in Example 14, thereby evaluating them in resistance to boundary bleeding between areas applied with inks of different tones using an ink-jet color printer, BJC600 (trade name, manufactured by Canon Inc.). The inks in Comparative Examples 1, 5, 7 and 8 were also combined to use as inks in Comparative Example 11, thereby conducting the same evaluation as described above. The results are shown in Table 3. The results of the evaluation were ranked in accordance with the following standard:

- A: Boundaries between areas applied with inks of different tones were sharp, and no boundary bleeding was recognized;
- C: Boundaries between areas applied with inks of different tones blurred, and so boundary bleeding occurred.

TABLE 2

| | Water fastness | | Print quality | | Frequency respon- | Kogation |
|---|---|---|---|---|---|---|
| | (A) | (B) | (A) | (B) | siveness | resistance |
| Ex. 1 | A | A | AA | AA | A | A |
| Ex. 2 | A | A | AA | AA | A | A |
| Ex. 3 | A | A | AA | AA | A | A |
| Ex. 4 | A | A | AA | AA | AA | A |
| Ex. 5 | A | A | AA | AA | A | A |
| Ex. 6 | A | B | AA | AA | A | A |
| Ex. 7 | A | A | AA | AA | B | A |
| Ex. 8 | A | A | AA | AA | A | A |
| Ex. 9 | A | B | AA | AA | A | A |
| Ex. 10 | A | A | AA | AA | B | A |
| Ex. 11 | A | A | AA | AA | A | B |
| Ex. 12 | A | A | AA | AA | A | A |
| Ex. 13 | A | A | AA | AA | A | A |
| Comp. Ex. 1 | A | B | B | B | A | B |
| Comp. Ex. 2 | B | B | A | A | A | B |
| Comp. Ex. 3 | A | B | A | A | A | B |
| Comp. Ex. 4 | B | B | A | A | A | B |
| Comp. Ex. 5 | B | B | B | B | A | B |
| Comp. Ex. 6 | A | B | B | A | A | B |
| Comp. Ex. 7 | B | B | B | B | B | B |
| Comp. Ex. 8 | A | B | B | B | A | B |
| Comp. Ex. 9 | C | C | B | B | A | B |
| Comp. Ex. 10 | B | B | B | B | A | B |

TABLE 3

Results of evaluation

| Evaluation Item | Example 14 | Comparative Example 11 |
|---|---|---|
| Resistance to bleeding between areas applied with inks of different tones in color image | A | C |

Synthesis Examples 13 to 48

Similarly to Synthesis Examples 1 to 12, their corresponding reactive dye species and secondary amines or tertiary amines substituted by at least one radical selected from the group consisting of alkyl groups, a carboxyl group, salts of the carboxyl group, a sulfonic group and salts of the sulfonic group, which will be shown in column A and column B of Tables 4 to 8, respectively, were stirred for 24 hours under reaction-temperature conditions of 80° C., thereby synthesizing the intended dyes.

TABLE 4

| Synthesis Example | A | B |
|---|---|---|
| 13 | C.I. Reactive Yellow 2 | Compound 8 |
| 14 | C.I. Reactive Yellow 15 | Compound 18 |
| 15 | C.I. Reactive Yellow 37 | Compound 21 |
| 16 | C.I. Reactive Yellow 42 | Compound 17 |
| 17 | C.I. Reactive Green 8 | Compound 8 |
| 18 | C.I. Reactive Green 12 | Compound 18 |
| 19 | C.I. Reactive Green 19 | Compound 21 |
| 20 | C.I. Reactive Green 15 | Compound 17 |

TABLE 5

| Synthesis Example | A | B |
|---|---|---|
| 21 | C.I. Reactive Blue 19 | Compound 8 |
| 22 | C.I. Reactive Blue 38 | Compound 18 |
| 23 | C.I. Reactive Blue 49 | Compound 21 |
| 24 | C.I. Reactive Blue 176 | Compound 17 |
| 25 | C.I. Reactive Black 1 | Compound 8 |
| 26 | C.I. Reactive Black 5 | Compound 18 |
| 27 | C.I. Reactive Black 31 | Compound 21 |
| 28 | C.I. Reactive Black 39 | Compound 17 |

TABLE 6

| Synthesis Example | A | B |
|---|---|---|
| 29 | C.I. Reactive Brown 7 | Compound 8 |
| 30 | C.I. Reactive Brown 11 | Compound 18 |
| 31 | C.I. Reactive Brown 33 | Compound 21 |
| 32 | C.I. Reactive Brown 46 | Compound 17 |
| 33 | C.I. Reactive Orange 5 | Compound 8 |
| 34 | C.I. Reactive Orange 12 | Compound 18 |
| 35 | C.I. Reactive Orange 35 | Compound 21 |
| 36 | C.I. Reactive Orange 95 | Compound 17 |

TABLE 7

| Synthesis Example | A | B |
|---|---|---|
| 37 | C.I. Reactive Blue 15 | Compound 8 |
| 38 | C.I. Reactive Blue 21 | Compound 18 |
| 39 | C.I. Reactive Blue 72 | Compound 21 |
| 40 | C.I. Reactive Blue 77 | Compound 17 |
| 41 | C.I. Reactive Violet 2 | Compound 8 |
| 42 | C.I. Reactive Violet 5 | Compound 18 |
| 43 | C.I. Reactive Violet 6 | Compound 21 |
| 44 | C.I. Reactive Violet 22 | Compound 17 |

TABLE 8

| Synthesis Example | A | B |
|---|---|---|
| 45 | C.I. Reactive Red 24 | Compound 8 |
| 46 | C.I. Reactive Red 31 | Compound 18 |
| 47 | C.I. Reactive Red 45 | Compound 21 |
| 48 | C.I. Reactive Red 218 | Compound 17 |

Examples 15 to 50 and Comparative Examples 12 to 47

After 10.0 parts of thiodiglycol, 87.0 parts of purified water and 3.0 parts of their corresponding dyes prepared in Synthesis Examples 13 to 48 were mixed and thoroughly stirred into solutions, the resulting solutions were separately filtered under pressure through a Fluoropore Filter (trade name; product of Sumitomo Electric Industries, Ltd.) having a pore size of 0.45 μm, thereby preparing 36 kinds of inks according to Examples 15 to 50. Using these inks, printing tests were conducted to evaluate them in water fastness, frequency responsiveness and print quality in the same manner as in Examples 1 to 13. As a result, all the inks were ranked as A for the water fastness (A), the water fastness (B) and the frequency responsiveness, and AA for the print quality (A) and the print quality (B).

Inks according to Comparative Examples 12 to 47 were prepared by separately using the reactive dyes used in the syntheses of the dyes used in Examples 15 to 50 as their corresponding dyes. The inks thus obtained were evaluated in the same manner as in Examples 15 to 50. As a result, all the inks were ranked as C for the water fastness (A) and the water fastness (B), A for the frequency responsiveness, B for the print quality (A), and A for the print quality (B).

Examples 51 to 86 and Comparative Examples 48 to 83

After 10.0 parts of diethylene glycol, 3.0 parts of ethanol, 84.5 parts of purified water and 2.5 parts of their corresponding dyes prepared in Synthesis Examples 13 to 48 were mixed and thoroughly stirred into solutions, the resulting solutions were separately filtered under pressure through a Fluoropore Filter (trade name; product of Sumitomo Electric Industries, Ltd.) having a pore size of 0.45 μm, thereby preparing 36 kinds of inks according to Examples 51 to 86. Using these inks, printing tests were conducted to evaluate them in water fastness, frequency responsiveness and print quality in the same manner as in Examples 1 to 13. As a result, all the inks were ranked as A for the water fastness (A), the water fastness (B) and the frequency responsiveness, and AA for the print quality (A) and the print quality (B).

Inks according to Comparative Examples 48 to 83 were prepared by separately using the reactive dyes used in the syntheses of the dyes used in Examples 51 to 86 as their corresponding dyes. The inks thus obtained were evaluated in the same manner as in Examples 51 to 86. As a result, all the inks were ranked as C for the water fastness (A) and the water fastness (B), A for the frequency responsiveness, B for the print quality (A), and A for the print quality (B).

Examples 87 to 122 and Comparative Examples 84 to 119

After 5.0 parts of 2-pyrrolidone, 5.0 parts of thiodiglycol, 87.3 parts of purified water and 2.7 parts of their corresponding dyes prepared in Synthesis Examples 13 to 48 were mixed and thoroughly stirred into solutions, the resulting solutions were separately filtered under pressure through a Fluoropore Filter (trade name; product of Sumitomo Electric Industries, Ltd.) having a pore size of 0.45 μm, thereby preparing 36 kinds of inks according to Examples 87 to 122. Using these inks, printing tests were conducted to evaluate them in water fastness, frequency responsiveness and print quality in the same manner as in Examples 1 to 13. As a result, all the inks were ranked as A for the water fastness (A), the water fastness (B) and the frequency responsiveness, and AA for the print quality (A) and the print quality (B).

Inks according to Comparative Examples 84 to 119 were prepared by separately using the reactive dyes used in the syntheses of the dyes used in Examples 87 to 122 as their corresponding dyes. The inks thus obtained were evaluated in the same manner as in Examples 87 to 122. As a result, all the inks were ranked as C for the water fastness (A) and the water fastness (B), A for the frequency responsiveness, B for the print quality (A), and A for the print quality (B).

Examples 123 to 158 and Comparative Examples 120 to 155

After 7.0 parts of dipropylene glycol, 3.0 parts of glycerol, 87.0 parts of purified water and 3.0 parts of their corresponding dyes prepared in Synthesis Examples 13 to 48 were mixed and thoroughly stirred into solutions, the resulting solutions were separately filtered under pressure through a Fluoropore Filter (trade name; product of Sumitomo Electric Industries, Ltd.) having a pore size of 0.45 μm, thereby preparing 36 kinds of inks according to Examples 123 to 158. Using these inks, printing tests were conducted to evaluate them in water fastness, frequency responsiveness and print quality in the same manner as in Examples 1 to 13. As a result, all the inks were ranked as A for the water fastness (A), the water fastness (B) and the frequency responsiveness, and AA for the print quality (A) and the print quality (B).

Inks according to Comparative Examples 120 to 155 were prepared by separately using the reactive dyes used in the syntheses of the dyes used in Examples 123 to 158 as their corresponding dyes. The inks thus obtained were evaluated in the same manner as in Examples 123 to 158. As a result, all the inks were ranked as C for the water fastness (A) and the water fastness (B), A for the frequency responsiveness, B for the print quality (A), and A for the print quality (B).

According to the present invention, as described above, there can be provided dyes and inks which can improve the water fastness of prints without adversely affecting the image quality and the like of the prints when conducting printing on so-called plain paper such as acid paper and neutralized paper, commonly used in offices and the like.

Further, the present invention can provide inks which are also good in self stability and can conduct recording with high reliability without the least problem in an ink-jet recording system.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A dye represented by any one of the following general formulae:

    (I-1)

    (I-2)

    (I-3)

    (I-4)

    (I-5)

wherein D is a chromophore, R is a bivalent or trivalent linking group, and IM is a secondary or tertiary amine residue substituted by at least one radical selected from the group consisting of alkyl groups, a carboxyl group, salts of the carboxyl group, a sulfonic group, salts of the sulfonic group, a phosphoric group and salts of the phosphoric group, with the proviso that D, R and IM have 1 to 12 acid groups in total, wherein IM in each of the general formulae (I-1) to (I-5) is a compound represented by the following general formula (II) in the state of a sole compound;

    (II)

wherein $R_8$ denotes an alkyl group having 1 to 48 carbon atoms or hydrogen, $R_9$ denotes $-(CH_2)_a-X_2$ or hydrogen, in which a is an integer of 1 to 7, $R_{10}$ denotes $-(CH_2)_b-X_3$, $R_{11}-Y_2-$ or hydrogen, in which b is an integer of 1 to 7, $R_{11}$ denotes an alkyl group having 1 to 48 carbon atoms or hydrogen, $Z_2$ denotes $-(NR_{12}C_lH_{2l})_c(NHC_nH_{2n})_d-$, in which l and n are independently an integer of 2 to 4, and c+d is an integer of 0 to 50, $Y_2$ denotes $(NR_{13}C_mH_{2m})_e(NHC_pH_{2p})_f-$, in which m and p are independently an integer of 2 to 4, and e+f is an integer of 0 to 50, $R_{12}$ denotes $-(CH_2)_g-X_4$, in which g is an integer of 1 to 4, $R_{13}$ denotes $-(CH_2)_h-X_5$, in which h is an integer of 1 to 4, and $X_2$, $X_3$, $X_4$ and $X_5$ are independently selected from the group consisting of a carboxyl group, a sulfonic group and hydrogen, with the proviso that the compound of the general formula (II) has at least one carboxyl group, salt of the carboxyl group, sulfonic group or salt of the sulfonic group; and wherein the compound of the general formula (II) has at least two nitrogen atoms.

2. The dye according to claim 1, wherein the acid groups are selected from the group consisting of a sulfonic group, salts of the sulfonic group, a carboxyl group and salts of the carboxyl group.

3. The dye according to claim 1, wherein the number of the acid groups is 3 to 8.

4. The dye according to claim 1, wherein the chromophore is a residue of an azo dye, anthraquinone dye, phthalocyanine dye or triphenodioxazine dye.

5. The dye according to claim 1, wherein the chromophore is a residue of an azo dye derived from a benzene or naphthalene diazo component and a benzene, naphthalene or monocyclo heterocyclic coupler.

6. The dye according to claim 1, wherein IM of the compound represented by any one of the general formulae (I-1) to (I-5) has 1 to 32 alkyl groups.

7. The dye according to claim 1, wherein IM of the compound represented by any one of the general formulae (I-1) to (I-5) has 4 to 24 alkyl groups.

8. The dye according to claim 1, wherein IM of the compound represented by any one of the general formulae (I-1) to (I-5) has 6 to 18 alkyl groups.

9. The dye according to claim 1, wherein IM of the compound represented by any one of the general formulae (I-1) to (I-5) has at least one carboxyl group.

10. The dye according to claim 1, wherein c+d and e+f in the compound of the general formula (II) are independently an integer of 0 to 16.

11. The dye according to claim 1, wherein c+d and e+f in the compound of the general formula (II) are independently an integer of 0 to 8.

12. The dye according to claim 1, wherein the compound of the general formula (II) has at least one primary amino group or secondary amino group.

13. The dye according to claim 1, wherein a linking group in the compound represented by any one of the general formulae (I-1) to (I-5) is a dichlorotriazine group, a dichloroquinoxaline group, a 5-chloro-4-methyl-2-methylsulfonylpyrimidine group, a vinyl sulfone group, a 2,4-difluoro-5-chloropyrimidine group, a monochloromethoxytriazine group, a monochlorotriazine group, a trichloropyrimidine group, a sulfonyl group, a carbonyl group or a methylene group.

14. An ink comprising, in a liquid medium, a dye represented by any one of the following general formulae:

    (I-1)

    (I-2)

    (I-3)

    (I-4)

-continued

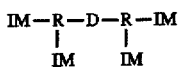
(I-5)

wherein D is a chromophore, R is a bivalent or trivalent linking group, and IM is a secondary or tertiary amine residue substituted by at least one radical selected from the group consisting of alkyl groups, a carboxyl group, salts of the carboxyl group, a sulfonic group, salts of the sulfonic group, a phosphoric group and salts of the phosphoric group, with the proviso that D, R and IM have 1 to 12 acid groups in total, wherein IM in each of the general formulae (I-1) to (I-5) is a compound represented by the following general formula (II) in the state of a sole compound;

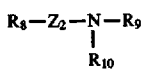
(II)

wherein $R_8$ denotes an alkyl group having 1 to 48 carbon atoms or hydrogen, $R_9$ denotes —$(CH_2)_a$—$X_2$ or hydrogen, in which a is an integer of 1 to 7, $R_{10}$ denotes —$(CH_2)_b$—$X_3$, $R_{11}$—$Y_2$— or hydrogen, in which b is an integer of 1 to 7, $R_{11}$ denotes an alkyl group having 1 to 48 carbon atoms or hydrogen, $Z_2$ denotes —$(NR_{12}C_lH_{2l})_c(NHC_nH_{2n})_d$—, in which l and n are independently an integer of 2 to 4, and c+d is an integer of 0 to 50, $Y_2$ denotes $(NR_{13}C_mH_{2m})_e$ $(NHC_pH_{2p})_f$—, in which m and p are independently an integer of 2 to 4, and e+f is an integer of 0 to 50, $R_{12}$ denotes —$(CH_2)_g$—$X_4$, in which g is an integer of 1 to 4, $R_{13}$ denotes —$(CH_2)_h$—$X_5$, in which h is an integer of 1 to 4, and $X_2$, $X_3$, $X_4$ and $X_5$ are independently selected from the group consisting of a carboxyl group, a sulfonic group and hydrogen, with the proviso that the compound of the general formula (II) has at least one carboxyl group, salt of the carboxyl group, sulfonic group or salt of the sulfonic group; and wherein the compound of the general formula has at least two nitrogen atoms.

15. The ink according to claim 14, wherein the acid groups are selected from the group consisting of a sulfonic group, salts of the sulfonic group, a carboxyl group and salts of the carboxyl group.

16. The ink according to claim 14, wherein the number of the acid groups is 3 to 8.

17. The ink according to claim 14, wherein the chromophore is a residue of an azo dye, anthraquinone dye, phthalocyanine dye or triphenodioxazine dye.

18. The ink according to claim 14, wherein the chromophore is a residue of an azo dye derived from a benzene or naphthalene diazo component and a benzene, naphthalene or monocyclo heterocyclic coupler.

19. The ink according to claim 14, wherein IM of the compound represented by any one of the general formulae (I-1) to (I-5) has 1 to 32 alkyl groups.

20. The ink according to claim 14, wherein IM of the compound represented by any one of the general formulae (I-1) to (I-5) has 4 to 24 alkyl groups.

21. The ink according to claim 14, wherein IM of the compound represented by any one of the general formulae (I-1) to (I-5) has 6 to 18 alkyl groups.

22. The ink according to claim 14, wherein IM of the compound represented by any one of the general formulae (I-1) to (I-5) has at least one salt of a carboxyl group.

23. The dye according to claim 14, wherein c+d and e+f in the compound of the general formula (II) are independently an integer of 0 to 16.

24. The inkl according to claim 14, wherein c+d and e+f in the compound of the general formula (II) are independently an integer of 0 to 8.

25. The ink according to claim 14, wherein the compound of the general formula (II) has at least one primary amino group or secondary amino group.

26. The ink according to claim 14, wherein a linking group in the compound represented by any one of the general formulae (I-1) to (I-5) is a dichlorotriazine group, a dichloroquinoxaline group, a 5-chloro-4-methyl-2-methylsulfonylpyrimidine group, a vinyl sulfone group, a 2, 4-difluoro-5-chloropyrimidine group, a monochloromethoxytriazine group, a monochlorotriazine group, a trichloropyrimidine group, a sulfonyl group, a carbonyl group or a methylene group.

27. The ink according to claim 14, wherein the counter ion of the acid group is an organic ammonium ion.

28. The ink according to claim 14, wherein a dye represented by any one of the general formulae (I-1) to (I-5) in which the counter ion of the acid group is an organic ammonium ion, and a dye represented by any one of the general formulae (I-1) to (I-5) in which the counter ion of the acid group is a monovalent metal ion are used in combination.

29. The ink according to claim 14, wherein the pH of the ink is at least 8.

30. The ink according to claim 14, wherein the ink comprises a polyhydric alcohol.

31. The ink according to claim 14, wherein the ink comprises an acid salt.

32. The ink according to claim 14, wherein the ink comprises at least one of urea, thiourea and derivatives thereof.

33. The ink according to claim 14, wherein the ink comprises at least one of a monohydric alcohol and a nonionic surfactant.

34. The ink according to claim 14, wherein the ink comprises a nonionic surfactant.

35. An ink-jet recording method comprising applying an ink to a recording medium by an ink-jet system to conduct recording, wherein the ink according to any one of claims 14-34 is used as said ink.

36. The ink-jet recording method according to claim 35, wherein the ink-jet system is a system in which thermal energy is applied to the ink to generate ink droplets.

37. A recording unit comprising an ink container portion and a head from which the ink is ejected in the form of ink droplets, wherein the ink according to any one of claims 14-34 used as said ink.

38. The recording unit according to claim 37, wherein an ink-jet system, in which thermal energy is applied to the ink to generate ink droplets, is applied to the head.

39. An ink cartridge comprising an ink container portion, wherein the ink according to any one of claims 14-34 is used as said ink.

40. An ink-jet recording apparatus comprising the recording unit according to claim 37.

41. An ink-jet recording apparatus comprising the recording unit according to claim 38.

42. An ink-jet recording apparatus comprising the ink cartridge according to claim 39.

43. The ink-jet recording apparatus according to claim 42, further comprising a head which generates ink droplets by an ink-jet system.

* * * * *

UNITED STATES PATENT AND TRADEMARK OFFICE
CERTIFICATE OF CORRECTION

PATENT NO. : 5,733,363
DATED : March 31, 1998
INVENTOR(S) : AKIRA NAGASHIMA, ET AL.

It is certified that error appears in the above-identified patent and that said Letters Patent is hereby corrected as shown below:

<u>Column 4</u>

Line 43, "$HO_2S$" should read --$HO_3S$--.

<u>Column 15</u>

Line 34, after the formula Dye 5, insert --, and--.

<u>Column 47</u>

Line 37, "formula" should read --formula (II)--.
Line 64, "dye" should read --ink--.

<u>Column 48</u>

Line 1, "inkl" should read --ink--.
Line 49, "used" should read --is used--.

Signed and Sealed this

Twenty-first Day of September, 1999

Attest:

Q. TODD DICKINSON

*Attesting Officer*     Acting Commissioner of Patents and Trademarks